US 8,125,667 B2

(12) United States Patent
Levy

(10) Patent No.: US 8,125,667 B2
(45) Date of Patent: Feb. 28, 2012

(54) SYSTEM AND METHOD FOR ENABLING TRANSACTIONS BY MEANS OF PRINT MEDIA THAT INCORPORATE ELECTRONIC RECORDING AND TRANSMISSION MEANS

(76) Inventor: Avery Levy, Harrison, NY (US)

( * ) Notice: Subject to any disclaimer, the term of this patent is extended or adjusted under 35 U.S.C. 154(b) by 1528 days.

(21) Appl. No.: 11/521,691

(22) Filed: Sep. 15, 2006

(65) Prior Publication Data

US 2008/0068637 A1 Mar. 20, 2008

(51) Int. Cl.
G06F 15/00 (2006.01)
(52) U.S. Cl. ............ 358/1.15; 358/1.14; 358/1.16; 700/213; 700/220; 705/34
(58) Field of Classification Search .......... 358/1.14, 358/1.15, 1.16; 700/213, 220; 705/34
See application file for complete search history.

(56) References Cited

U.S. PATENT DOCUMENTS

| | | | | |
|---|---|---|---|---|
| 3,652,830 | A | 3/1972 | Kessler | 235/487 |
| 4,462,866 | A | 7/1984 | Tooth et al. | 162/103 |
| 6,130,613 | A | 10/2000 | Eberhardt et al. | 340/572.7 |
| 6,259,367 | B1 | 7/2001 | Klein | |
| 6,259,369 | B1 | 7/2001 | Monico | 340/572.8 |
| 6,402,888 | B1 | 6/2002 | Doublet et al. | 162/140 |
| 6,636,833 | B1 | 10/2003 | Flitcroft et al. | 705/1 |
| 6,911,115 | B2 | 6/2005 | Mallol et al. | 162/116 |
| 6,965,866 | B2 | 11/2005 | Klein | |
| 6,993,507 | B2 | 1/2006 | Meyer et al. | 705/40 |
| 7,495,792 | B2 * | 2/2009 | Snowdon et al. | 358/1.16 |
| 2001/0018113 | A1 | 8/2001 | Mallol et al. | 428/195.1 |
| 2001/0034718 | A1 | 10/2001 | Shaked et al. | 705/64 |
| 2002/0167500 | A1 | 11/2002 | Gelbman | 345/204 |
| 2003/0040913 | A1 | 2/2003 | Praca | 704/273 |
| 2004/0052400 | A1 | 3/2004 | Inomata et al. | |
| 2004/0139004 | A1 | 7/2004 | Cohen et al. | 705/39 |
| 2004/0153649 | A1 | 8/2004 | Rhoads et al. | |
| 2004/0172537 | A1 | 9/2004 | Baus et al. | 713/170 |
| 2004/0243520 | A1 | 12/2004 | Bishop et al. | 705/75 |
| 2005/0108164 | A1 | 5/2005 | Salafia, III et al. | 705/42 |
| 2005/0116026 | A1 * | 6/2005 | Burger et al. | 235/380 |
| 2005/0123170 | A1 | 6/2005 | Desprez et al. | |
| 2005/0177480 | A1 * | 8/2005 | Huang | 705/34 |

(Continued)

FOREIGN PATENT DOCUMENTS

WO WO 00/16278 3/2000

(Continued)

OTHER PUBLICATIONS

International Search Report for PCT application # PCT/US 07/78373, filed Sep. 13, 2007.

(Continued)

Primary Examiner — Mark K Zimmerman
Assistant Examiner — Mark Milia
(74) Attorney, Agent, or Firm — Burns & Levinson, LLP; Jacob N. Erlich, Esq.

(57) ABSTRACT

A system and method for enabling automatic electronic, telephonic, and Internet transactions through print media, as well as providing value that flows to a supplier for the service of enabling such transactions. The transactions can utilize print media that can include electronic recording media and counterfeit protection, where the electronic recording media can identify suppliers of the media, providers of the service promoted by the electronic media, and can set a value for a supplier, such as a print media supplier or facilitator.

77 Claims, 16 Drawing Sheets

U.S. PATENT DOCUMENTS

| | | |
|---|---|---|
| 2005/0187883 A1 | 8/2005 | Bishop et al. .................... 705/67 |
| 2005/0213790 A1 | 9/2005 | Rhoads et al. |
| 2005/0216118 A1* | 9/2005 | Conard et al. ................. 700/223 |
| 2005/0218236 A1 | 10/2005 | Silverbrook et al. .......... 235/494 |
| 2005/0242197 A1 | 11/2005 | Morrow et al. ................ 235/492 |
| 2006/0010086 A1 | 1/2006 | Klein |
| 2006/0161789 A1* | 7/2006 | Doughty et al. ............... 713/186 |
| 2006/0277414 A1* | 12/2006 | Kotani et al. .................. 713/189 |
| 2007/0078559 A1* | 4/2007 | Rosen ............................ 700/220 |
| 2007/0083379 A1* | 4/2007 | Rosenkranz et al. .............. 705/1 |
| 2007/0178260 A1 | 8/2007 | Levy et al. |
| 2007/0178261 A1 | 8/2007 | Levy et al. |
| 2008/0061967 A1* | 3/2008 | Corrado ................... 340/539.26 |
| 2008/0065500 A1* | 3/2008 | Foth et al. ........................ 705/26 |

FOREIGN PATENT DOCUMENTS

| | | |
|---|---|---|
| WO | WO 02/084615 | 10/2002 |

OTHER PUBLICATIONS

Paper Having Discrete Regions of Ferromagnetic Material and Process of Making the Same, LA-7736-102US, filed on Jan. 27, 2006.

I Paper, A New Media, Ed. Jan. 2, 2005 by Paper Gate Systems.

Paper Envelop Having an Integrated Magnetic Recording Medium, LA-7736-101US, filed on Jan. 27, 2006.

* cited by examiner

| | DIRECT MARKETING (e.g. MACY'S) | TRANSACTIONAL MAILER (e.g. VERIZON - PROXY SVCS) | A GENERIC CREDIT/DEBIT CARD (e.g. MACY'S or VERIZON) | CREDIT/DEBIT CARD (e.g. VISA) | BANK DEPOSIT ENVELOPE (e.g. CHASE) | GIFT CARD (e.g. MODELL'S) |
|---|---|---|---|---|---|---|
| SKE | ENVELOPE MANUFACTURER | ENVELOPE MANUFACTURER | ENVELOPE MANUFACTURER | ENVELOPE MANUFACTURER | ENVELOPE MANUFACTURER | ENVELOPE MANUFACTURER |
| ETN IF MAILED WRITTEN BY | COURIER | COURIER | COURIER | COURIER | N/A | N/A |
| SK-N where N = | SKD | SKT | SKC/D | SKK | SKB | SKG |
| SKN WRITTEN BY | DIRECT MARKETER or INSERTER | TRANSACTIONAL MAILER or INSERTER | MAILER or INSERTER | CREDIT CARD ISSUER | ENVELOPE MANUFACTURER | ENVELOPE MANUFACTURER |
| SKN REPRESENTS | CONSUMER | CONSUMER | CONSUMER | CONSUMER | BANK | GIFT CARD RETAILER |
| PRINT MEDIA SUPPLIER CUSTOMER | DIRECT MARKETER | TRANSACTIONAL MAILER | PRINT MEDIA SUPPLIER | CREDIT CARD ISSUER | BANK | GIFT CARD RETAILER |
| WSN WRITTEN BY | DIRECT MARKETER | TRANSACTIONAL MAILER | PRINT MEDIA SUPPLIER | CREDIT CARD ISSUER | BANK | GIFT CARD RETAILER |
| WSN REPRESENTS | COUPON OR DISCOUNT VALUE NUMBER | TRANSACTION NUMBER | CREDIT/DEBIT LIMIT NUMBER | CREDIT/DEBIT LIMIT NUMBER | TRANSACTION NUMBER | GIFT AMOUNT |
| NETWORK | INTERNET - INTRANET | INTERNET - INTRANET | INTERNET - INTRANET | INTERNET - INTRANET | INTERNET - INTRANET | INTERNET - INTRANET |
| FLOWCHART | FIG. 6 FIG. 7 | FIG. 6 FIG. 7 | FIGS. 10A AND 10B | FIGS. 10A AND 10B | FIG. 12 | FIG. 11 |

FIG. 13A

| | UNIVERSAL COUPON ISSUER (e.g. VALUEPAK) | SPORT ENTERTAINMENT (e.g. NYY or BROADWAY) | TRAVEL TICKET (e.g. DELTA or AMTRAK) | PAYROLL DEBIT CARD (e.g. ADP) | PHONE CARD (e.g. AT&T) | DISCOUNT CARD (e.g. SEARS) |
|---|---|---|---|---|---|---|
| SKE | ENVELOPE MANUFACTURER | ENVELOPE MANUFACTURER | ENVELOPE MANUFACTURER | ENVELOPE MANUFACTURER | ENVELOPE MANUFACTURER | ENVELOPE MANUFACTURER |
| ETN IF MAILED WRITTEN BY | COURIER | N/A | N/A | N/A | N/A | N/A |
| SK-N where N = | SKP | SKS/E | SKV | SKY | SKO | SKU |
| SKN WRITTEN BY | UNNIVERSAL COUPON ISSUERS | ENVELOPE MANUFACTURER | ENVELOPE MANUFACTURER | PAYROLL PROCESSOR | ENVELOPE MANUFACTURER | DISCOUNT CARD RETAILER |
| SKN REPRESENTS | CONSUMER | ENTERTAINER | TRANSPORTER | EMPLOYEE | CONSUMER | CONSUMER |
| PRINT MEDIA SUPPLIER CUSTOMER | UNNIVERSAL COUPON ISSUERS | ENTERTAINER | TRANSPORTER | PAYROLL PROCESSOR | LONG DISTANCE CARRIER | DISCOUNT CARD RETAILER |
| WSN WRITTEN BY | UNNIVERSAL COUPON ISSUERS | ENTERTAINER | TRANSPORTER | PAYROLL PROCESSOR | RETAIL CARRIER | DISCOUNT CARD RETAILER |
| WSN REPRESENTS | COUPON OR DISCOUNT VALUE NUMBER | COUPON OR DISCOUNT VALUE NUMBER | COUPON OR DISCOUNT VALUE NUMBER | NET PAYROLL AMOUNT NUMBER | $ AMOUNT OR # OF MINUTES NUMBER | DISCOUNT VALUE NUMBER |
| NETWORK | INTERNET - INTRANET | INTERNET - INTRANET | INTERNET - INTRANET | INTERNET - INTRANET | INTERNET - INTRANET | INTERNET - INTRANET |

FIG. 13B

| | MEMBERSHIP ID CARD (e.g. THE COUNTRY CLUB) | CASINO or GAMING CARD (e.g. HARRAH'S) | HOTEL KEY CARD (e.g. HILTON) | UNIVERSAL TRAVEL CARD (e.g. TRAVELOCITY) | PERSONAL INVITATION (e.g. BRIDE) | PORTABLE FAVORITES FILE |
|---|---|---|---|---|---|---|
| SKE | ENVELOPE MANUFACTURER | ENVELOPE MANUFACTURER | ENVELOPE MANUFACTURER | ENVELOPE MANUFACTURER | ENVELOPE MANUFACTURER | ENVELOPE MANUFACTURER |
| ETN IF MAILED WRITTEN BY | N/A | N/A | N/A | COURRIER | COURRIER | N/A |
| SK-N where N = | SKM | SKC/G | SKH | SKI | SKI | SKF |
| SKN WRITTEN BY | ORGANIZATION | CASINO | HOTEL | TRAVEL AGENCY | PERSONALIZER | PRINT MEDIA SUPPLIER |
| SKN REPRESENTS | MEMBER | CONUMER / MEMBER | ROOM NUMBER | CONSUMER | GUEST | CUSTOMER |
| PRINT MEDIA SUPPLIER CUSTOMER | ORGANIZATION | CASINO | HOTEL | TRAVEL AGENCY | PERSONALIZER | CONSUMER |
| WSN WRITTEN BY | ORGANIZATION | CASINO | HOTEL | TRAVEL AGENCY | PRINT MEDIA SUPPLIER | CONSUMER |
| WSN REPRESENTS | COUPON OR DISCOUNT VALUE NUMBER or MEMBER'S PRIVILEDGE NUMBER | COUPON OR DISCOUNT VALUE NUMBER or MEMBER'S PRIVILEDGE NUMBER | OCCUPANT'S COUPON OR DISCOUNT VALUE NUMBER or OCCUPANT'S PRIVILEDGE NUMBER | RESERVATION NUMBER AIR, HOTEL, and/or CAR | BRIDAL REGISTRY NUMBER or RESPONSE CONFIRMATION NUMBER | FAVORITES TEMPLATE NUMBER |
| NETWORK | INTRANET | INTRANET | INTRANET | INTERNET - INTRANET | INTERNET - INTRANET | INTERNET - INTRANET |

FIG. 13C

SYSTEM AND METHOD FOR ENABLING TRANSACTIONS BY MEANS OF PRINT MEDIA THAT INCORPORATE ELECTRONIC RECORDING AND TRANSMISSION MEANS

BACKGROUND

This invention relates generally to automatic electronic and telephonic and Internet transactions through print media, as well as providing value that flows to a supplier such as, for example, a print medium supplier, a provider, or other facilitator, for the service of enabling such transactions.

Printed communications and advertisements supply information about possible transactions, where the term "transaction" is used herein to mean at least one interaction between parties, about which a recipient might be interested. Print media includes all forms of printed communications and may include all forms of packaging for goods and products. The term "transaction" may also include the desire of a consumer to purchase said goods and products. Possible transactions can include, but are not limited to, commercial or private transactions, legal transactions, or other transactions, to name a few examples. Printed communications and advertisements typically require that the recipient manually conduct the transaction, either by telephoning an establishment, such as, for example, a commercial establishment, by accessing the web page of the establishment, by physical transport (i.e. the USPS mail, courier service such as FEDEX or UPS, etc.) or by going to the establishment to make the transaction or purchase. Each of these activities could require a measure of organization on the part of the recipient, and thus the establishment could lose timely response or sales simply because the communication and/or advertisement becomes misplaced among the recipient's other printed mediums and papers.

Likewise, printed bills require manual reaction to pay the bill by mail or phone. Bills can also be misplaced and remain unpaid.

What is needed is a system by which transactions associated with printed material could be conducted automatically, thus relieving the recipient of the extra task of organizing printed material and reacting to it at a later time.

What is further needed is to converge the print medium and the electronic medium to facilitate the payments of bills and/or the transactions being communicated or advertised and to automate and make it easier for the recipient to conduct such transactions by automatically connecting the recipient to the mailer of the print media communicating and/or advertising such transactions or requesting payments of bills.

It is further to the advantage of the supplier of the printed material or other facilitators to enable such transactions associated with the printed material when mechanisms exist to assess compensation, for example a fee, on such enablement in order to generate value, for example a revenue stream, based on the compensation.

SUMMARY

The needs set forth above as well as further and other needs are addressed by the present invention. The solutions and advantages of the present invention are achieved by the illustrative embodiment described herein below.

The system and method of the present invention enable electronic transactions using print media, and a value, for example a revenue stream, flowing to the manufacturer of the print media or other facilitators as a result of the transactions. In particular, a print medium includes electronic recording media, preferably in specific locations on the print medium. During the manufacturing, printing, packaging, inserting processes, or thereafter, digital or analog data, referred to herein as print medium supplier electronic print information or facilitator electronic print information, are recorded onto the electronic recording medium that serves as a key to be verified by a print media reader/recorder before other data on the electronic recording medium are able to be accessed or additional further data are able to be recorded. The material used to construct the print medium can include, but is not limited to, paper, cardboard, plastic, textiles, leather, rubber, glass, mirrors, stone, wood, ferrous and non-ferrous metals, and synthetic materials or any manufactured or converted product from said list of materials such as, but not limited to cards, labels, envelopes, boxes, cartons, cans, bottles, packaging of all forms, flexible and non flexible packaging, containers of all forms and shapes, etc., anything that can be printed and/or recorded upon. As used herein, the term "paper" can include, but is not limited to, conventional paper derived from wood fiber products, and also paper made from rice, corn, fibrous and film synthetics, such as, for example, plastics such as, for example, polyethylene, polyethylene terethate (MYLAR®), polyvinyl chloride, etc. The term "paper" can also include cardboard and other laminated or reinforced paper forms.

After the manufactured print media are provided to an establishment, each print medium can be encoded electronically with provider electronic print information or facilitator electronic print information which can be uniquely associated with (1) the user, consumer or recipient to whom the print medium is addressed or intended and specifically targeting information for that user, consumer or recipient (2) data related to or placed on the electronic recording medium, (3) contents of the print medium, and (4) transactions arising from the user, consumer or recipient of the print medium. Further the provider electronic print information or facilitator electronic print information can include a unique identifier that can be used to obtain from the Internet any data associated with the print medium such as, for example, name address, account code, credit card code, security password, web site address, telephone number, transaction code, etc., as well as any other personalized and customized targeted information. After the initial provider electronic print information or facilitator electronic print information is recorded to the print medium, the print medium may preferably become a read-many, record-once electronic recording medium.

The system of the present invention for enabling a transaction can include, but is not limited to, a print medium that can include, but is not limited to, an electronically recordable section upon which electronic print information is recorded and a print media reader/recorder that can access the electronic print information from the electronically recordable section, receive user verification information from a user, and receive user authentication information through user input to authenticate the user. The system can optionally include a print media reader/recorder transaction tracer that can monitor and record the transaction.

The system can also include a print media monitor that can receive the electronic print information from the print media reader/recorder, determine from the electronic print information if the user is authorized to access the electronic print information on the print medium, enable the transaction by electronically coupling the user identified by the electronic print information with a provider identified by the electronic print information, trace the transaction in order to calculate and assess a compensation, for example a fee, and establish a value, for example a revenue stream, based on the compensation.

The system can further include a supplier that can supply the print medium, and can receive at least part of the value. The supplier can be, for example, a facilitator or a print media supplier, and the provider can also supply the print medium. The facilitator can facilitate the transaction, and can receive at least part of the value, and the print media supplier can supply the print medium, and also can receive at least part of the value. The provider can be, for example, the facilitator or an establishment, either of which can receive at least part of said value.

Electronic print information such as, for example, but not limited to, print medium supplier electronic print information, facilitator electronic print information, and provider electronic print information can be can be accessed by a special purpose data accessor, referred to herein as a print media reader/recorder. The print media reader/recorder can generally read and record electronic print information, and can be built in several different ways including, but not limited to, a provider print media reader/recorder, a facilitator print media reader/recorder, an establishment print media reader/recorder, a user print media reader/recorder, and a supplier print media reader/recorder. Each of these print media reader/recorders can support different functionality, as will be described herein. A user print media reader/recorder, for example, which is a print media reader/recorder that is geared for end-user use, can be (1) equipped to receive electronic data from the print medium, (2) is connected to, or is itself an integral part of, a computer such as, for example, a user personal computer, a cell phone, or a personal data assistant (PDA), and/or (3) connected to a telephone line. In general, the print media reader/recorder can, for example, receive and record provider electronic print information, user identifying electronic print information, print media supplier electronic print information, and facilitator electronic print information on the electronically recordable section. The print media reader/recorder can also include a biometric reader that can, for example, receive user authentication information and, for example, either provide it to the print media monitor or perform authentication within the print media reader/recorder itself in an authentication processor. The print media reader/recorder can accept, for example through the biometric reader, user verification information in order to initialize its database or a print media database with information that would allow verification of user authentication information to occur. The print media reader/recorder can also include a print media electronic data accessor that can access the electronic print information from the print media and provide it to the print media monitor. The print media reader/recorder can also include a card reader that can, for example, read and record coded electronic and/or magnetic information and provide it to the print media monitor.

To continue with the previous example, the user print media reader/recorder can access information from the print medium and provide that information to a print medium monitor that can, by executable logic or other means known in the art, verify the print medium supplier electronic print information or facilitator electronic print information, and then access the provider electronic print information or facilitator electronic print information to automatically open a web site associated with the provider, the establishment, or other facilitators on the computer, if the print media reader/recorder is connected to the user's personal computer, a cell phone, or a personal data assistant (PDA) that is in electronic communications with a communications network. If the print media reader/recorder is connected to a telephone, the print media reader/recorder can automatically dial a telephone number, which can be either manually or automatically updated, that will provide electronic communication between the print media reader/recorder and the print media monitor, which can verify the print medium supplier electronic print information or facilitator electronic print information and access the provider electronic print information or facilitator electronic print information to automatically dial a telephone number associated with the establishment or other facilitators with a targeted personalized customized audio message and instructions, or automatically connecting the print medium user to a customer service representative or personal telemarketer.

The print media monitor can verify that the print medium is supplied by the print media supplier or the facilitator by comparing the print medium supplier electronic print information with predetermined print media supplier information or predetermined facilitator information. The print media monitor can also include a biometric processor that can, for example, determine user status from the user authentication information that is received from the biometric reader, and provide verification of user authentication information by either comparing biometric information with data stored in a print media database, if this verification is not performed by the print media reader/recorder, or in addition to such a verification. The print media monitor can also include a mapping processor that can determine the provider/facilitator/establishment/print media supplier identified by the provider/facilitator/print media supplier electronic print information and the user that could be identified by the user identifying electronic print information, can enable electronic communication between the provider/facilitator/establishment/print media suppler and the user, and can map the electronic print information to applications associated with the provider and possibly a user identified by the electronic print information. The print media monitor can still further include, but is not limited to, a supplier authenticator that can verify print medium supplier electronic print information or facilitator electronic print information, a security code processor that can determine appropriate processing based on a security code read from encoded print media by the print media reader/recorder, a print media reader/recorder transaction tracer that can trace activities of the print media reader/recorder and recording them in the print media database, and can compute and assess the compensation, for example a fee, on behalf of the provider, an establishment, a facilitator, or a print media supplier. The security code can include any alphanumeric or symbolic character. The print media monitor can track any use of the print media reader/recorder and any transactions with respect to the information on the print medium, can assess a compensation associated with the activity associated with the print medium, and can use the compensation to generate value for the print media supplier, provider or other facilitators. Note that the provider and the supplier could be one and the same entity.

The electronically recordable section can be, for example, an electronic recording means, and can include, for example, but not limited to, print medium supplier electronic print information, provider electronic print information, and facilitator electronic print information, and optionally user identifying electronic print information and user authentication information. The print medium supplier electronic print information can be recorded by the print medium supplier, and can, for example, include contact information for the print medium supplier. The provider electronic print information can be recorded by the provider and can, for example, include contact information for the provider and identify goods and services offered. The user identifying electronic print information can, for example, be recorded by the provider and can include, for example, the contact information for the recipient of the print medium, and the user authentication information can be, for example, recorded by the provider, and can specify, for example, the type of user authentication required. Facilitator electronic print information can be recorded by the facilitator and can include, for example, contact information for the facilitator and information about the compensation to be assessed.

The print medium can be, for example, an envelope or a sheet of paper, and can be constructed of, for example, any synthetic or natural material that can be written to and/or recorded upon. The print medium can include, but is not limited to, a security code that can be decoded, for example, by the provider, supplier, facilitator, print media supplier, and/or establishment.

The electronic print information can be, but is not limited to, print medium supplier electronic print information, provider electronic print information, facilitator electronic print information, and user identifying electronic print information.

In the illustrative embodiment, the electronic print information can include, but is not limited to, three distinct fields or areas or tracks: a track containing the print medium supplier electronic print information or facilitator electronic print information and the provider electronic print information or facilitator electronic print information, a record track containing a security code, and a record track containing a transaction, reference, or comment code. The print media supplier electronic print information, the provider electronic print information and/or the facilitator electronic print information can also adhere to any available industry standards and be placed on any number of distinct fields, areas, or tracks. If there is a security code recorded on the print medium, a connection must be made with the provider in order for the security code to become meaningful. For this reason, the electronic print medium of the present invention could be a more secure alternative to credit/debit cards. In the present invention, if the print medium is in the form of an envelope, it can be converted to a credit card by simply writing security code related to a specific debit or credit amount.

The user print media reader/recorder can be assigned a media access control (MAC) address, or an ESN or IMEI code, which are hardware addresses that identify a node on a network. Further, the Automatic Number Identification (ANI) system can be applied to the user print media reader/recorder. Because the MAC and/or the ESN or IMEI is unique, it can be associated with a specific household telephone or user's computer, cell phone, PDA. The print media reader/recorder can also optionally have the capability to access data from and record data to the print medium Also, the print media reader/recorder can have the capability of recording and accessing a user's authenticated password, biometric identifying information, such as, for example, fingerprints or voice recognition, in order to activate the further capabilities of the print media reader/recorder only after biometric verification has taken place. There can also be provider and supplier print media reader/recorders that record customized information onto the print medium before it is made available to the user, recipient or consumer of the print media.

The print media monitor, communicatively coupled with the network, and thus in communication with the personal computer, cell phone, or PDA that is connected to the user print media reader/recorder, can trace all the activities of the user print media reader/recorder. Through executable logic or other means known in the art, the print media monitor can use the unique provider electronic print information or facilitator electronic print information to trigger executable programs to display, transact, or initiate transactions, as well as to assess a compensation, for example a fee, associated with the enabling of the transaction, in order to generate value for the print media supplier or other facilitators.

The content of the print media can be used to enable communications between a user and the website associated with other facilitators or the establishment from which the print media was sent. Convergence occurs between the printed medium and electronic communication, that is, by connecting the print medium to the Internet, a personalized and customized message using a single advertising carrier medium can trigger not just advertisement from a text-based printed-paper, but also personalized, customized, and targeted messages from audio, and video files sent over the Internet. Furthermore, the print medium could then converge to contain a personalized and customized message in a single advertising carrier medium containing both a printed text message and an electronic message of audio and video information. Personalized discounts and value coupons could also be customized and offered. Another form that print media can take is transactional mail including, but not limited to, financial services, billing, credit cards, insurance, telecommunications, and utilities. In this case, the print medium is encoded such that transaction information required for making a response or a payment is automatically and securely communicated. Another form print media can take is packaging converted or manufactured from of all sorts of materials containing all types of durable and non durables consumer and industrial goods and products, any material that can be printed and/or recorded upon. Yet another form that print media can take is shipment tracking provider electronic print information to access and view the progress of a shipment. Yet still another form that print media can take is a card-shaped media coin-size credit or debit envelope or an envelope or paper that includes a credit card-sized perforated or imperforated section, whose available credit can be tracked through a security code by the print media monitor. The security code could be used, but is not limited to, represent or relate to a certain debit and/or credit limit or value. The security code could also represent a fixed dollar amount that the user transferred from a bank account to the coin-size debit envelope. Such a debit envelope could be used to transfer money from person to person through, for example, the mail. Other possible print medium applications can include, but are not limited to, ATM card, phone card, gift card, storage medium, travel ticket, sporting/entertainment event ticket, commuter ticket, deposit/withdrawal slip, hotel key, security identification, and gaming identification.

The method of the present invention for establishing a compensation for enabling a transaction through a print medium that incorporates an electronically recordable section can include, but is not limited to, the steps of verifying that a user is associated with a print media reader/recorder, accessing, through the print media reader/recorder, the electronic print information recorded on the electronically recordable section provided by a supplier of the print medium, and verifying from the electronically recordable section that the user is associated with the print medium. The method can further include the steps of accessing a provider identified in the electronically recordable section, enabling the transaction between the user and the provider, and tracing the transaction to establish the compensation for the step of enabling. The method can optionally include the step of establishing a value for the supplier or facilitator by assessing the compensation to the user, provider, supplier, facilitator, or establishment. The method can further optionally include the step of providing communications between the user and the provider, establishment, facilitator, or supplier through, for example, an Internet connection or a telephone line. The method can still further optionally include the steps of providing printed information on the print medium and recording the electronic print information, associated with the printed information, on the electronically recordable section.

The method of the present invention for generating value by enabling a transaction through a print medium envelope can include, but is not limited to, the steps of providing, by a supplier, the print medium envelope that includes at least one electronically recordable section, determining a customer from the print medium envelope insert using a print media reader/recorder, recording customized transaction information on the print medium envelope and the print medium envelope insert, inserting a print medium envelope insert into the print medium envelope. The method can also include the steps of mailing the print medium envelope through a physical transport, receiving the mailed print medium envelope, accessing the customized transaction information from the print medium envelope through a user print media reader/recorder, enabling the at least one transaction between a user identified by the customized transaction information and a provider identified by the customized transaction information, tracing the transaction to assess a compensation, for example a fee, and generating a value, for example a revenue stream, based on the compensation. The supplier in this method can be, for example, a print media supplier or a facilitator, and the provider can be, for example an establishment or a facilitator. The method can optionally include the steps of personalizing and customizing the print medium envelope with a printed message and an electronic message, and personalizing, customizing, and targeting the print medium envelope with audio messages, and video messages, personalized discounts, and coupon offerings. The method can further optionally include the steps of receiving the value into the supplier, facilitator, print media supplier, provider, or establishment.

For a better understanding of the present invention, together with other and further objects thereof, reference is made to the accompanying drawings and detailed description. The scope of the present invention is pointed out in the appended claims.

DESCRIPTION OF THE SEVERAL VIEWS OF THE DRAWING

FIGS. 13A-13C are tables providing illustrative data associated with various uses of electronic print information of the print media of the present invention.

DETAILED DESCRIPTION OF THE INVENTION

Figure 1:
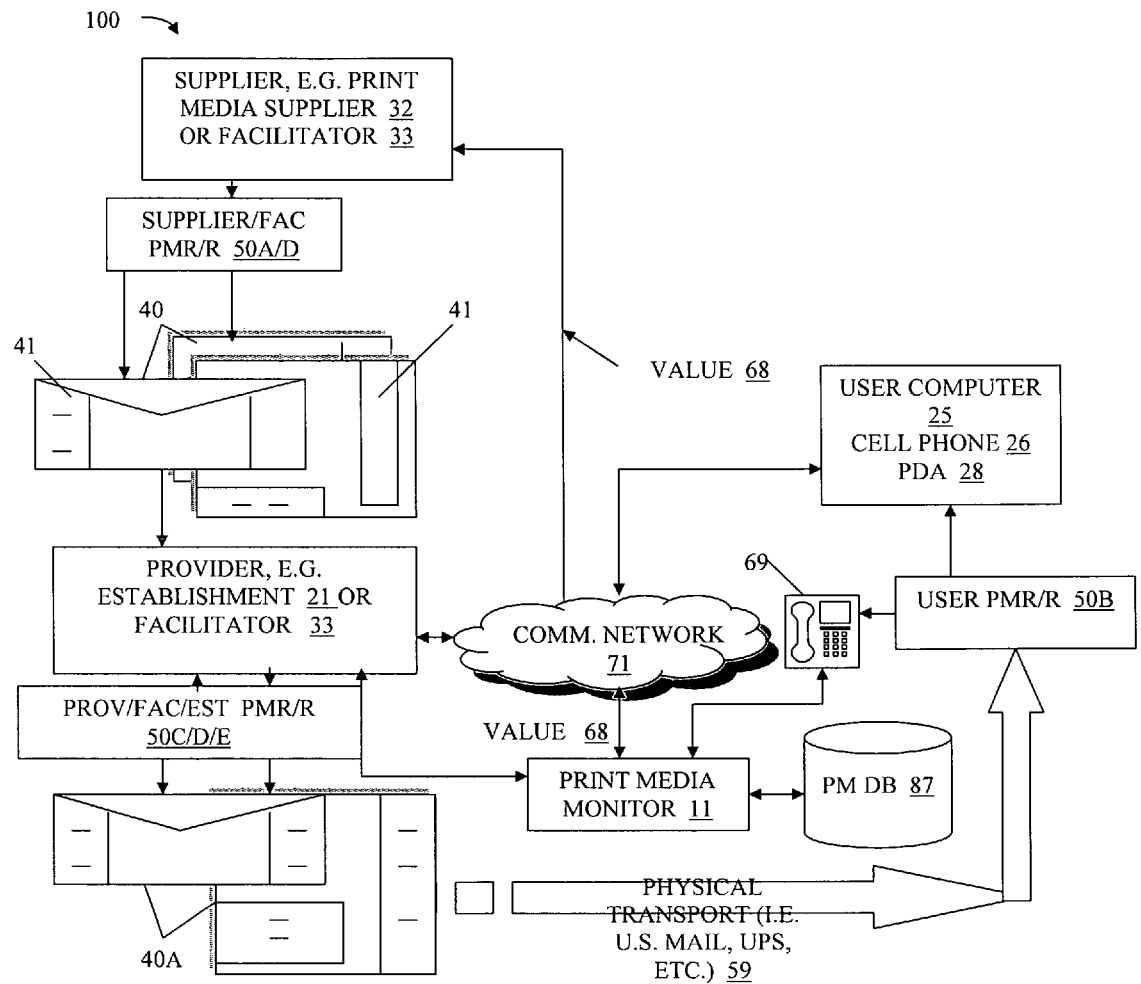
FIG. 1 is a schematic block diagram of the system of the present invention.

The present invention is now described more fully hereinafter with reference to the accompanying drawings, in which alternate embodiments of the present invention are shown. The following configuration description is presented for illustrative purposes only.

Referring now to the drawings, there is illustrated a system and flow charts defining the various operations which take place for various applications utilizing the print media of the present invention. The print medium of the present invention is a structure or device utilizing technologies such as ferromagnetism, embedded or affixed RFID chip(s), printed RFID antennas utilizing magnetic or conductive inks and conductive glues, chips of all forms, including but not limited to wireless chips be they utilizing inductive coupling or any other form of energy transfer as well as any other available technologies, in conjunction with printed media, as is known in the art, and in addition, providing certain pre-defined types of data and a device and process for interpreting those data.

Referring now primarily to FIG. 1, system 100 can include, but is not limited to, a supplier, such as print media supplier 32, or facilitator 33, three print media reader/recorders 50, print media monitor 11, print media database 87, a provider such as establishment 21 or facilitator 33, and user computer 25 such as, for example, a personal computer (PC), a cell phone 26, or a personal data assistant (PDA) 28. Operationally, the provider receives print media 40 from the supplier, which uses supplier print media reader/recorder 50A to encode print media supplier electronic print information 17 (FIG. 4) on print media 40, within electronically recordable sections 41. Print media 40 can include, but are not limited to, paper, cardboard, plastic, textiles, and synthetic materials or any manufactured or converted product from said list of materials such as, but not limited to cards, labels, envelopes, boxes, cartons, packaging of all forms, flexible and non flexible packaging, containers of all forms and shapes, etc. Recordable sections 41 can include, but are limited to, all references to technologies such as ferromagnetism, embedded or affixed RFID chip(s), printed RFID antennas utilizing magnetic or conductive inks and conductive glues, chips of all forms, including but not limited to wireless chips be they utilizing inductive coupling or any other form of energy transfer as well as any other available technologies, in conjunction with printed media, as is known in the art, and in addition, providing certain pre-defined types of data and a device and process for interpreting those data. Print media reader/recorder 50 can be, but is not limited to be, a provider print media reader/recorder 50C, a facilitator print media reader/recorder 50D, an establishment print media reader/recorder 50E, a user print media reader/recorder 50B, or a supplier print media reader/recorder 50A. Provider print media reader/recorder 50C can access, through communications network 71, print media database 87 to verify print medium supplier electronic print information 17 (FIG. 4) or facilitator electronic print information 14A. The term supplier, as used herein, is intended to refer to any possible supplier of print media 40. The term provider, as used herein, is intended to refer to any possible provider of transactions associated with print media 40. Note that the provider and the supplier could be one and the same entity. Print media supplier 32, as used herein, is intended to be applicable to any source of print media 40. Establishment 21, as used herein, is intended to be applicable to any user of print media 40 for any desired application as will become more apparent from the description in the spreadsheets and flow charts that will follow. Facilitator 33 refers to, for example, but not limited to, a systems integrator, a hardware or software supplier, an internet company or any other entity facilitating the transactions between the print media supplier 32, provider, the establishment 21 and the physical transport courier of print media 40. After the provider (e.g. establishment 21 or facilitator 33) has authenticated and verified print media 40, the provider (e.g. establishment 21 or facilitator 33) can apply to the print media whatever information is desired to be transmitted to a recipient.

Figure 4:
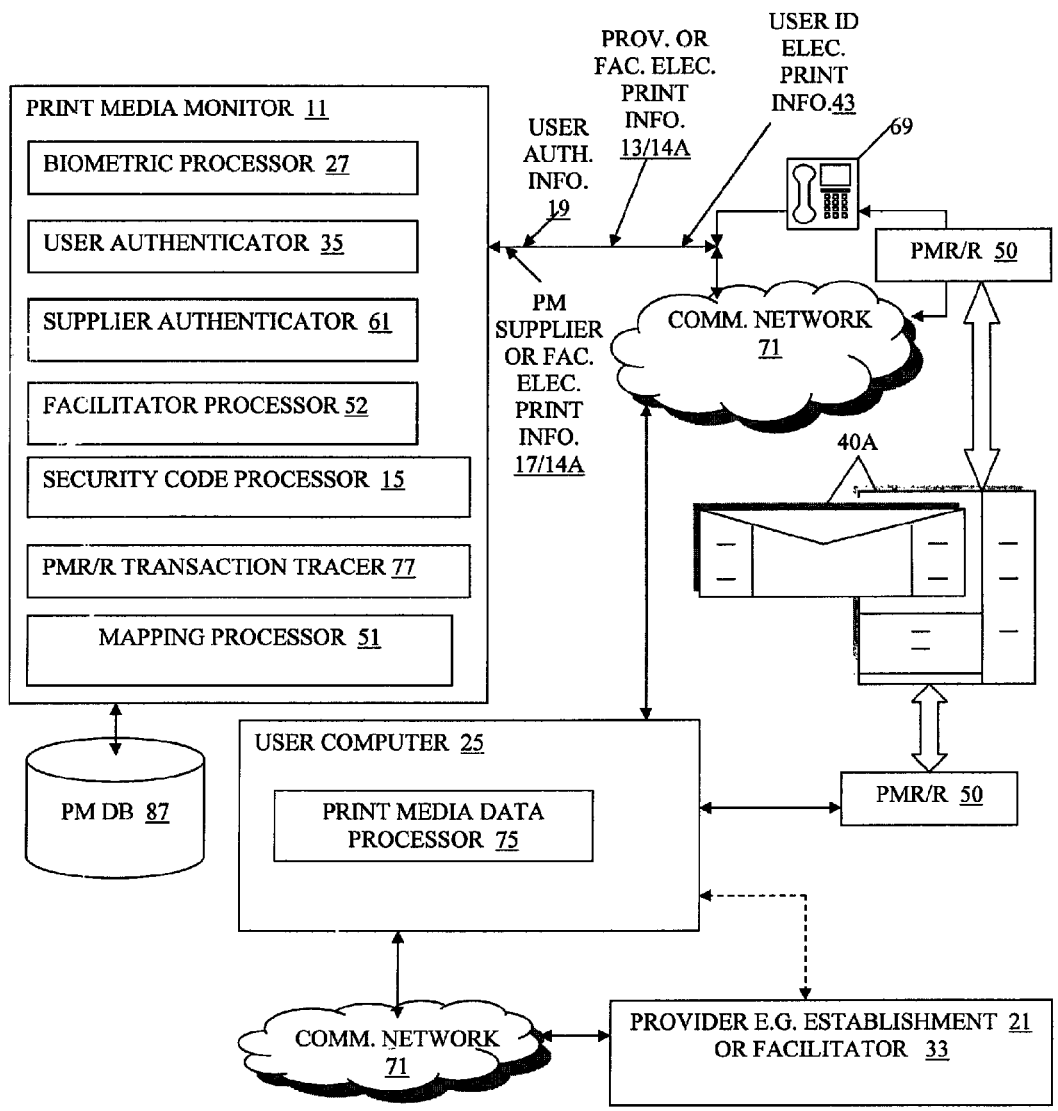
FIG. 4 is a schematic block diagram of the elements of the print media monitor of the present invention.

Provider print media reader/recorder 50C can encode print media 40 with provider electronic print information 13 (FIG. 4) or facilitator electronic print information 14A in electronically recordable sections 41. Print media 40 can, but is not limited to, be delivered or transmitted by physical transport 59 to a recipient. The recipient can be equipped with user print media reader/recorder 50B that can include a mechanism for authenticating a user by means of a password or biometrics, for example, a fingerprint, or voice recognition. User print media reader/recorder 50B can also be used to record user-related information. Upon receipt of print media 40, the recipient can present biometric identification to user print media reader/recorder 50B. User print media reader/recorder 50B can determine if the user who is using user print media reader/recorder 50B is authorized to perform such activity by checking, against a password or biometric stored in user print media reader/recorder 50B and/or elsewhere as obtained through communications network 71, user authorization information 19 (FIG. 4). User print media reader/recorder 50B may not be activated unless the user identification, for example a password or biometric of the user, matches that which has been imprinted into the chip which is contained in the user print media reader/recorder 50B during its initialization. After the recipient has been authenticated, the recipient can introduce print media 40 and electronically recordable sections 41 to user print media reader/recorder 50B to access print media information that is contained in and/or related to print media 40. User print media reader/recorder 50B can access, through communications network 71, print media database 87 to verify print medium supplier electronic print information 17 or facilitator electronic print information 14A and provider electronic print information 13 (FIG. 4) or facilitator electronic print information 14A. Such print media information can be used to conduct transactions or respond to messages contained on print media 40. If user computer 25 or user cell phone 26 or PDA 28 is in electronic communication with user print media reader/recorder 50B, user computer 25 or user cell phone 26 or PDA 28 can, through its connection with communications network 71, access print media database 87 to verify again print medium supplier electronic print information 17 (FIG. 4) or facilitator electronic print information 14A and provider electronic print information 13 (FIG. 4) or facilitator electronic print information 14A of print media 40 and also to interconnect through communications network 71 with a conventional website or conventional automated call distribution (ACD) of facilitator 33 or establishment 21. When this connection is made, the recipient can, through the utilization of the facilitator or establishment web-site, respond to information contained on print media 40 or alternatively, may conduct e-commerce transactions with facilitator 33 and/or establishment 21 through the facilitator and/or establishment website or ACD. The recipient may use credit card information to pay for any type of e-commerce transaction or alternatively, may have an account established with facilitator 33 and/or establishment 21 or possibly through print media supplier 32 to accommodate the costs of conducting the e-commerce transactions. Alternatively, the print media supplier, the provider, the facilitator, or the establishment may record on the print media a security code which could be used, but is not limited to, representing or relating to a certain debit and/or credit limit or amount thus immediately turning the print media into a conventional debit and/or credit card or instrument. Print media supplier 32, provider, establishment 21, supplier, and/or facilitator 33 can benefit from value 68 generated by a compensation computed by print media monitor 11 that can be assessed for the service of enabling the transaction. Further, print media monitor can execute within, for example, but not limited to, user computer 25 or user cell phone 26 or PDA 28.

Continuing to refer to FIG. 1, as an alternative to utilization of user computer 25 or user cell phone 26 or PDA 28 and communications network 71 to contact the facilitator and/or the establishment website, introducing print media 40 to user print media reader/recorder 50B may, if a telephone connection is enabled in user print media reader/recorder 50B, interconnect to telephone 69 which can automatically dial an automated call distribution (ACD) belonging, for example, to print media supplier 32 or to facilitator 33 or to establishment 21 which then can connect the customer to a customer service representative of establishment 21 after which the recipient may then conduct transactions or respond to the message or messages contained on print media 40 which the recipient has received from establishment 21. In addition, when telephone 69 automatically dials a telephone number set forth in print media 40, the recipient may receive a targeted personalized customized audio message and instructions with regard to specific transactional information desired to be communicated by facilitator 33 and/or establishment 21. In either case, print media monitor 11 is informed of the transaction, tracks it, assesses a compensation, for example a fee, and provides for value 68, for example a revenue stream, based on the compensation, flowing to facilitator 33, provider, supplier, establishment 21, and/or print media supplier 32. A compensation can take the form of a percentage of the amount of the transaction that facilitator 33, for example, can expect to receive upon completion of the transaction, and the value can take the form of the monetary amount due to, for example, facilitator 33.

Figure 2:
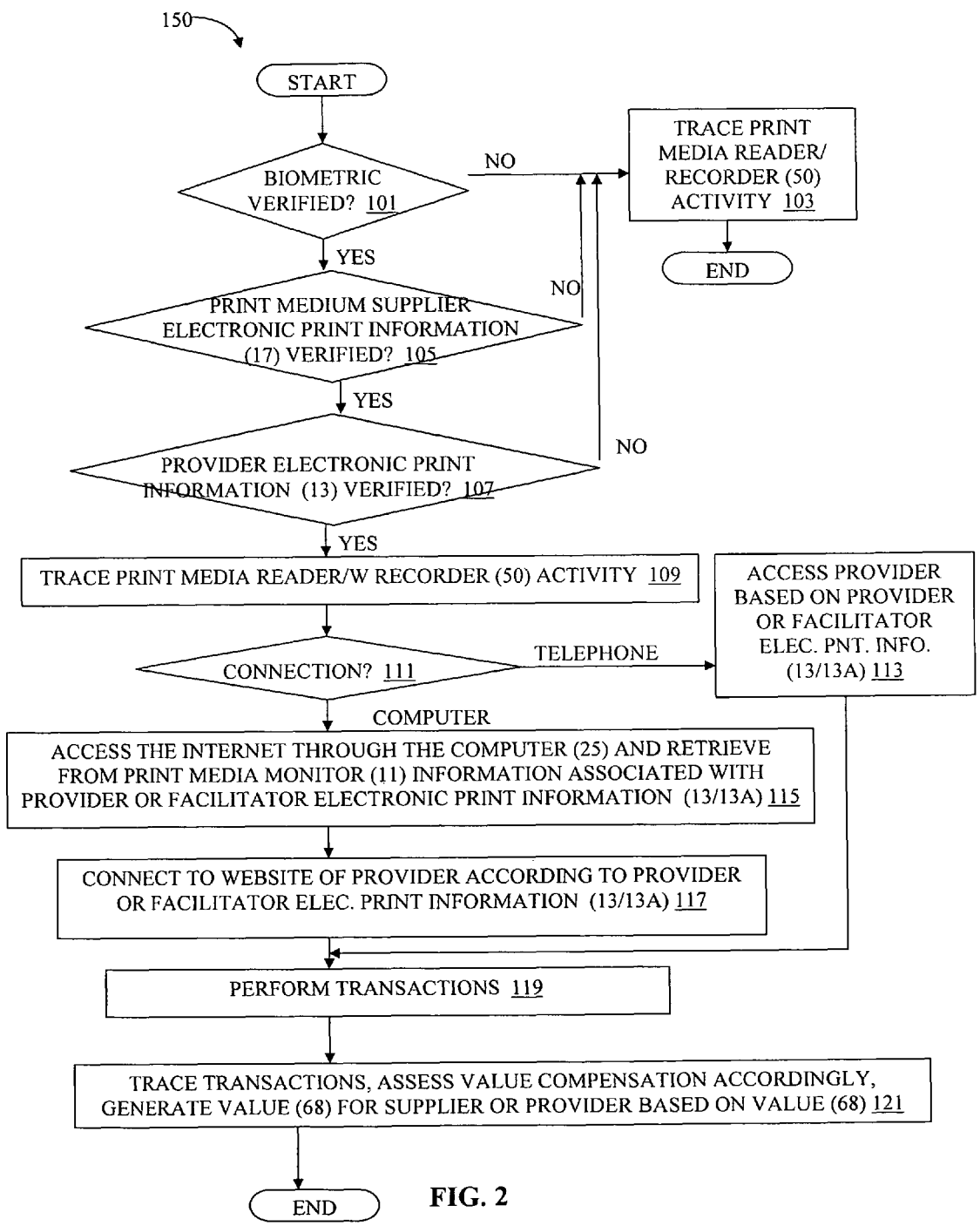
FIG. 2 is a flowchart of the method of the present invention.

Referring now primarily to FIG. 2, method 150 for using print media reader/recorder 50 (FIG. 1) can include, but is not limited to, the steps of determining 101 if user authentication information 19 (FIG. 4) such as, for example, a password or a biometric identifier, is verified. If user authentication information 19 (FIG. 4) is not verified, print media monitor 11 (FIG. 1) traces the failure, and print media reader/recorder 50 (FIG. 1) can end the transaction. If user authentication information 19 (FIG. 4) is verified, and if print medium supplier electronic print information 17 (FIG. 4) or facilitator electronic print information 14A is verified 105 (which indicates that the print medium supplier electronic print information 17 (FIG. 4) or facilitator electronic print information 14A placed on print medium 40 (FIG. 1) by print media supplier 32 (FIG. 1) or facilitator 33 verifies that print medium 40 (FIG. 1) is not a counterfeit), and if provider electronic print information 13 (FIG. 4) or facilitator electronic print information 14A is verified 107, method 150 can include the step of tracing 109 print media reader/recorder 50 (FIG. 1) activity. If a communications network connection is made 111, method 150 can include the steps of accessing 113/115 communications network 71 (FIG. 1) through user computer 25 or user cell phone 26 or PDA 28 (FIG. 1) and retrieving from print media monitor 11 (FIG. 1) information associated with provider electronic print information 13 (FIG. 4) or facilitator electronic print information 14A, connecting 117 to the facilitator and/or establishment website or ACD according to provider electronic print information 13 (FIG. 4) or facilitator electronic print information 14A, and performing 119 transactions. If print medium supplier electronic information 17 (FIG. 4) or facilitator electronic print information 14A is not verified 105, or provider electronic print information 13 (FIG. 4) or facilitator electronic print information 14A is not verified 107, method 150 can include the steps of tracing 103 print media reader/recorder activity and ending the transaction on print media reader/recorder 50 (FIG. 1). Verification of print medium supplier electronic print information 17 (FIG. 4) or facilitator electronic print information 14A and provider electronic print information 13 (FIG. 4) or facilitator electronic print information 14A are accomplished by interconnection, through communications network 71 (FIG. 1), with print media database 87 (FIG. 1). Method 150 can further include the step of tracing 121 transactions, assessing a compensation accordingly, and generating value 68 (FIG. 1) for facilitator 33, provider, supplier, establishment 21, and/or print media supplier 32 (FIG. 1) based on the compensation.

Figure 3:
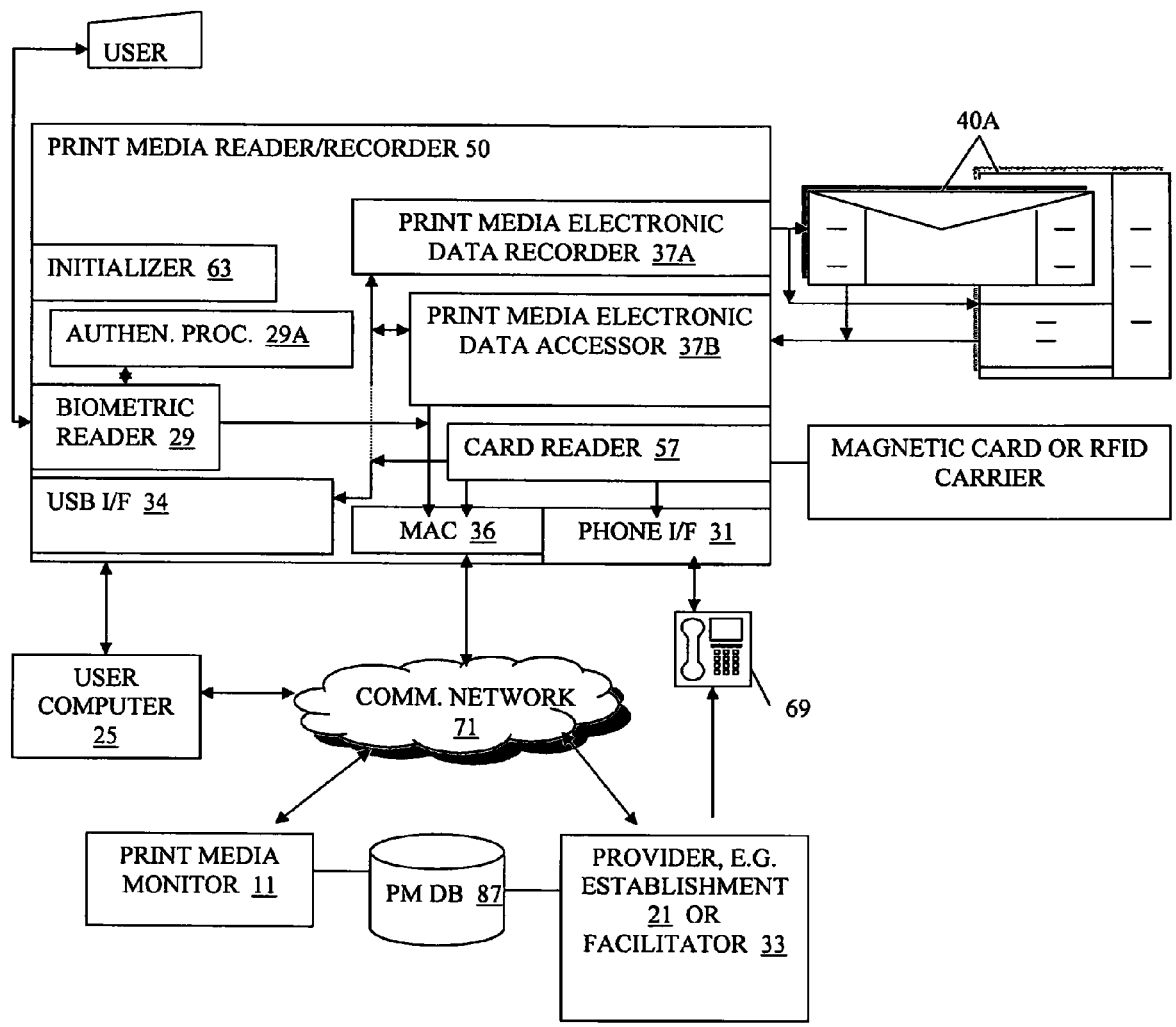
FIG. 3 is a schematic block diagram of the elements of the print media reader/recorder of the present invention.

Referring now primarily to FIG. 3, print media reader/recorder 50 can include, but is not limited to, initializer 63, print media electronic data recorder 37A, print media electronic data accessor 37B, media access control (MAC) 36, ESN or IMEI, user authenticator 35, biometric reader 29, an authentication processor 29A, and telephone interface 31, optionally being augmented by the inclusion of Automatic Number Identification (ANI). Print media reader/recorder 50 refers to the common features shared among supplier print media reader/recorder 50A (FIG. 1), provider print media reader/recorder 50C (FIG. 1), and user print media reader/recorder 50B (FIG. 1). Operationally, initializer 63 can, among other activities, set initial parameters for each component of print media reader/recorder 50 when power is supplied to print media reader/recorder 50. Biometric reader 29 can receive user authentication information 19 such as, for example, a password, a fingerprint or voice recognition, and authentication processor 29A can validate that information through, for example, comparison with predetermined data in print media reader/recorder 50. Alternatively user authenticator 35 (FIG. 4) in print media monitor 11 can validate user's password or code or user's biometric by comparison with user verification information previously gathered by print media reader/recorder 50 and stored in print media database 87. Print media electronic data accessor 37B can recognize electronic print information on coded print medium 40A such as, for example, print medium supplier electronic print information 17 (FIG. 4) or facilitator electronic print information 14A, provider electronic print information 13 (FIG. 4) or facilitator electronic print information 14A, and user identification electronic print information 43 (FIG. 4). Electronic print information can be provided to user computer 25 having a MAC 36 address through USB interface 34 or user cell phone 26 or PDA 28 having an ESN or IMEI through communications network 71 and print media database 87. Electronic print information can be used to instruct print media reader/recorder 50 and user computer 25 or user cell phone 26 or PDA 28 to connect to the website or ACD of the facilitator 33, the print media supplier 32 and/or the establishment 21. Provider electronic print information 13 or facilitator electronic print information 14A can also be used to instruct print media reader/recorder 50 to access telephone 69 through telephone interface 31 and dial a pre-determined number associated with print media supplier 32, facilitator 33, and/or establishment 21 that can be referred to in the provider electronic print information 13 or facilitator electronic print information 14A. Optionally, print media reader/recorder 50 can include print media electronic recorder 37A that can be used to encode print media 40 with, for example, further user-specific information and card reader 57 that can be used to read coded electronic information from card-shaped media be it an envelope, a paper or other form of print medium.

Referring now primarily to FIG. 4, print media monitor 11 can include, but is not limited to, biometric processor 27, user authenticator 35, supplier authenticator 61, facilitator processor 52, mapping processor 51, and print media reader/recorder transaction tracer 77. Print media monitor 11 can be accessed by user computer 25, user cell phone 26, or PDA 28 through communications network 71 after encoded print media 40A has been introduced to print media reader/recorder 50. Supplier authenticator 61 can provide verification of print medium supplier electronic print information 17 or facilitator electronic print information 14A, and optionally biometric processor 27 can provide verification of user authentication information 19, through, for example, comparisons with data stored in print media database 87. Print media reader/recorder transaction tracer 77 can trace activities of print media reader/recorder 50 and record them in, for example, print media database 87 for later inspection. Print media reader/recorder transaction tracer 77 can also compute and assess a compensation on behalf of provider or establishment 21, facilitator 33 and/or print media supplier 32 (FIG. 1). User authenticator 35 can optionally be used to verify any user identification electronic print information 43 that might be supplied on encoded print media 40A. Security code processor 15 can optionally map special codes on encoded print media 40A to appropriate processing, and mapping processor 51 can map provider electronic print information 13 or facilitator electronic print information 14A to processing specific to associated facilitator 33 and/or establishment 21 and a user identified by user identification electronic print information 43. Print media data processor 75 can facilitate transactions by providing a website interface to websites identified by encoded print media 40A. Print media monitor 11 can execute within equipment such as, for example, but not limited to, a PC, a cell phone, or a PDA.

Figure 5:
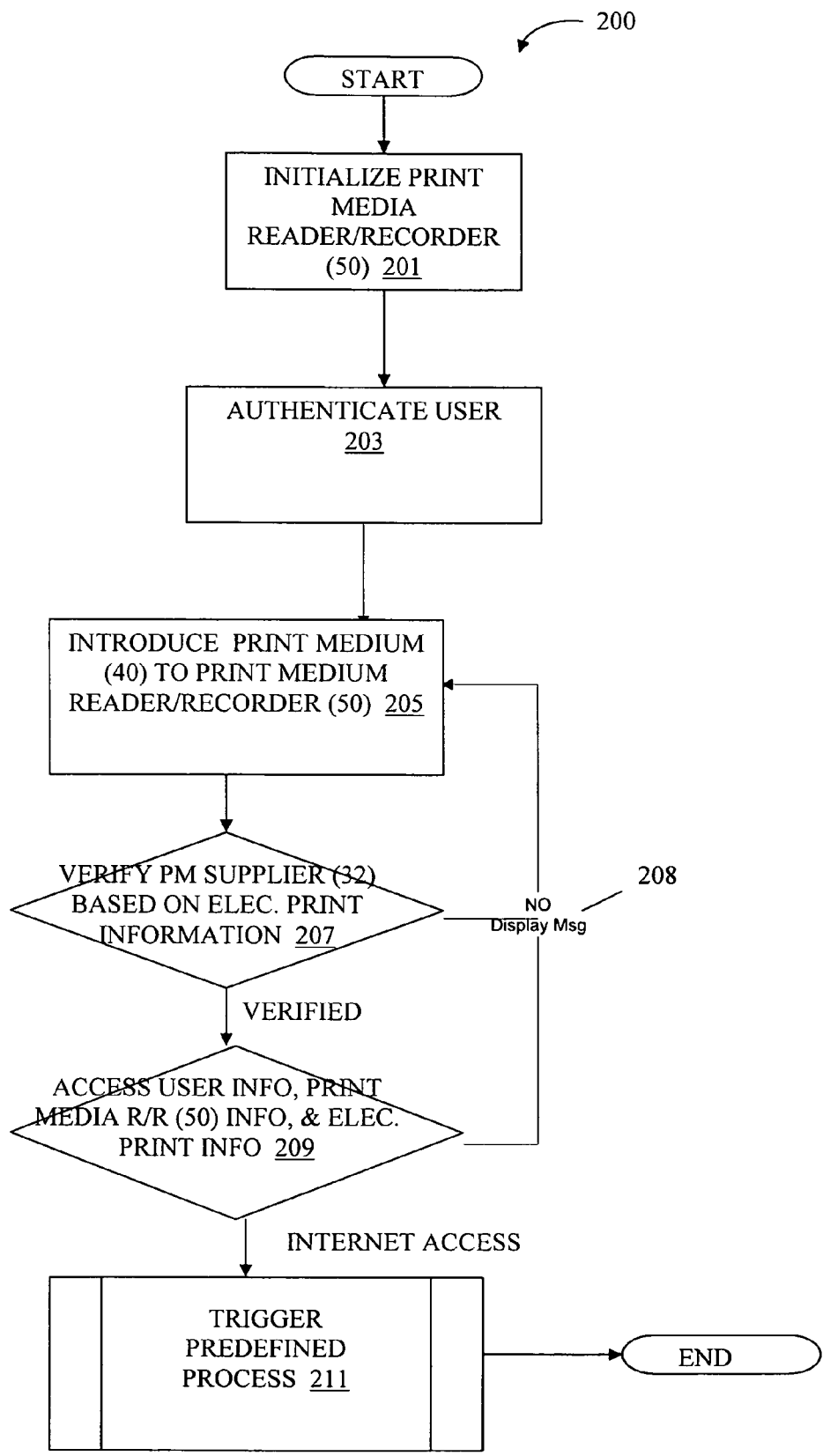
FIG. 5 is a flowchart of the use of the print media reader/recorder of the present invention to access and utilize the print media of the present invention.

Referring now primarily to FIG. 5, method 200 for using print media reader/recorder 50 (FIG. 1) can include the steps of initializing or activating 201 print media reader/recorder 50 (FIG. 1) after the user provides a password code or a biometric identifier, such as, for example, a fingerprint or voice recognition, and authenticating 203 the user by, for example, comparing the biometric identifier with predetermined data that are programmed into print media reader/recorder 50 (FIG. 1). Method 200 can include the step of introducing 205 print media 40 (FIG. 1) to print media reader/recorder 50 (FIG. 1). If print media supplier identification data verifies 207 by comparing to predefined print supplier information or, for example, by a comparison of print media database 87 (FIG. 1) accessed through communications network 71 (FIG. 1), with print medium supplier electronic print information 17 (FIG. 4) or facilitator electronic print information 14A. If print media supplier identification data does not verify 207, method 200 can include the steps of displaying 208 a message and preparing the system to accept other information. If print media supplier identification data does verify 207, and if Internet access is indicated 209 from provider electronic print information 13 (FIG. 4) or facilitator electronic print information 14A, print media 40 (FIG. 1) is authentic and provider electronic print information 13 (FIG. 4) or facilitator electronic print information 14A is used to enable communications network 71 (FIG. 1) access to trigger 211 a predefined process on the print media supplier's, the provider's, the facilitator's or the establishment's website or by dialing their telephone number. Method 200 assumes that print media reader/recorder 50 (FIG. 1) is already configured in that it has the required MAC address, ESN or IMEI and is programmed to receive authenticating information, such as, for example, a password code or biometric information.

Figure 6:
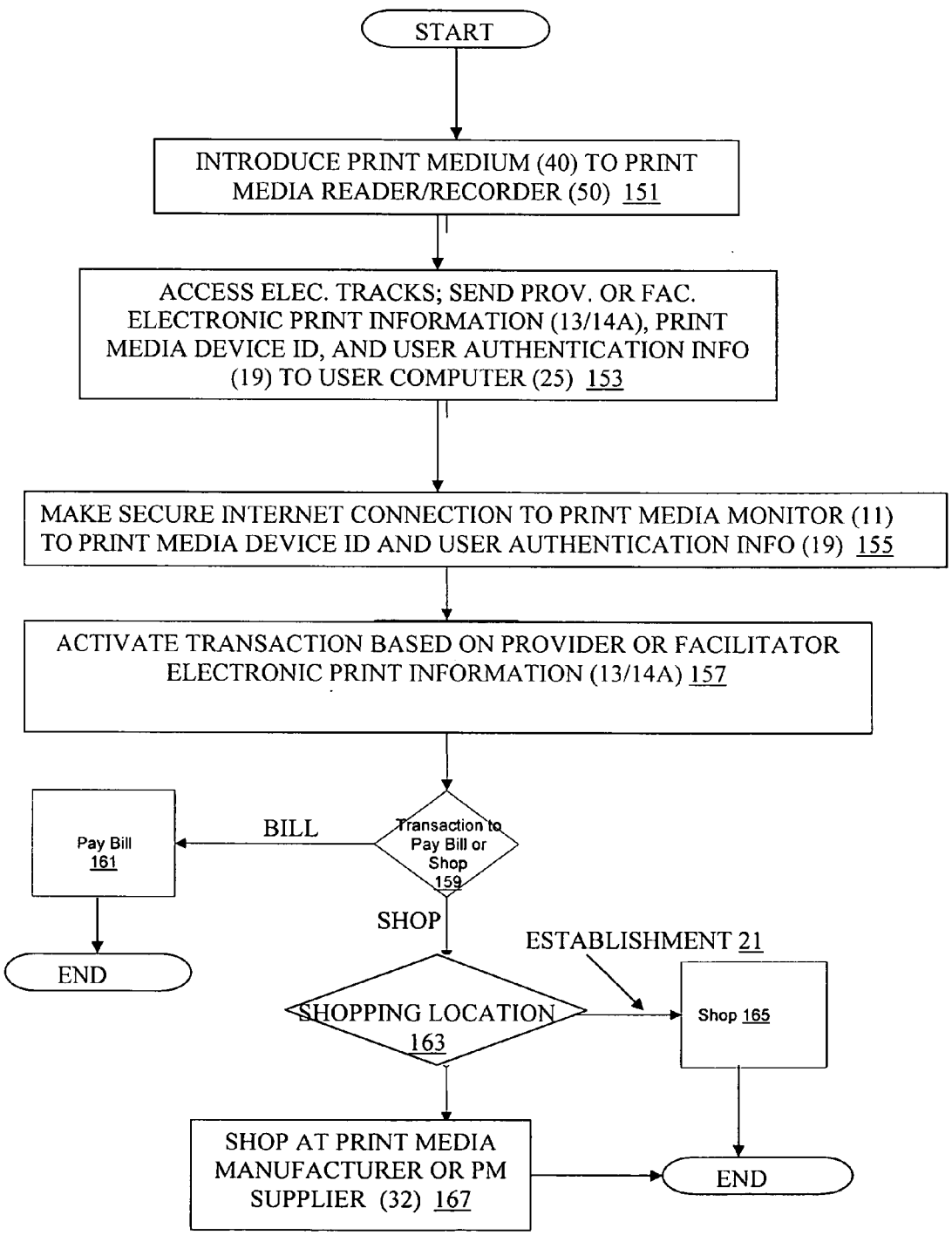
FIG. 6 is a flowchart of the use of the print media of the present invention to perform transactions through the Internet.

Referring now primarily to FIG. 6, method 500, for accessing Internet capabilities through use of print media 40 (FIG. 1), can include, but is not limited to, the steps of introducing 151 print medium 40 to print media reader/recorder 50 (FIG. 1) which recognizes electronic print information stored on print media 40 (FIG. 1). Method 500 can further include the steps of accessing 153 electronically recordable section and sending provider electronic print information 13 (FIG. 4) or facilitator electronic print information 14A (FIG. 4), print media device identification, and user authentication information 19 (FIG. 4) to user computer 25 (FIG. 1). Method 500 can further include the step of making 155 a secure connection to the print media database 87 (FIG. 1) to verify that the electronic print information that was recognized on print media 40 (FIG. 1). If verification is correct, as was previously discussed, method 500 includes the step of activating 157 a transaction based on provider electronic print information 13 (FIG. 4) or facilitator electronic print information 14A (FIG. 4). For example, if 159 the transaction is to pay a bill, then appropriate activity to accomplish that occurs as shown at 161. If (decision 159), however, the activity is to conduct e-commerce transactions, and if (decision 163) the shopping location is a vendor, then such occurs by interconnection with the vendor's website or ACD as shown at 165 to permit the particular e-commerce transaction to occur. It may be also available that the user is connected to the website or ACD of the manufacturer of print media 40 (FIG. 1) so that appropriate shopping or other e-commerce transactions may occur as is illustrated at 167.

Figure 7:
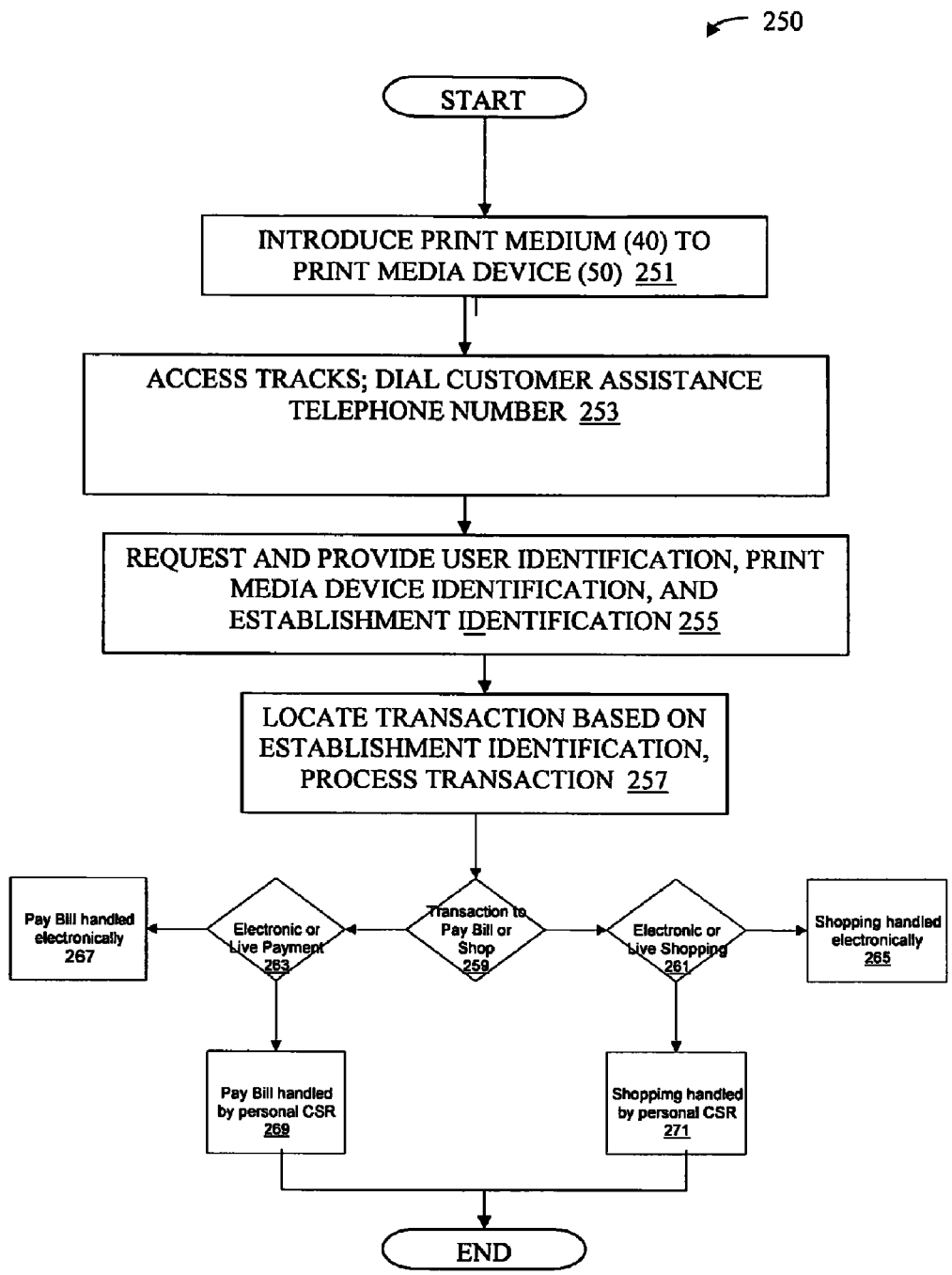
FIG. 7 is a flowchart of the use of the print media of the present invention to conduct transactions using the telephone.

Referring now primarily to FIG. 7, method 250, a method for interconnecting print media 40 (FIG. 1) with a telephone for appropriate transactions or communications, can include, but is not limited to, the steps of introducing 251 print media 40 (FIG. 1) to print media reader/recorder 50 (FIG. 1), accessing 253 tracks of the electronic print information, and dialing a manufacturer's ACD automatic call distribution which requests 255 the information for verification of print media 40 (FIG. 1) as above discussed. If print media 40 (FIG. 1) verifies, method 250 can include the step of locating and processing 257 the desired transaction. For example, if 259 the transaction is to pay a bill, then such may be done through the ACD electronically 267 or by way of live payment 263. On the other hand, the payment of the bill may be handled by a personal customer service representative as shown at 269. Alternatively, the customer may accomplish shopping as shown at 261 either through utilization of an electronic connection as shown at 265 or by way of a special personal customer service representative as shown at 271.

Figure 8:
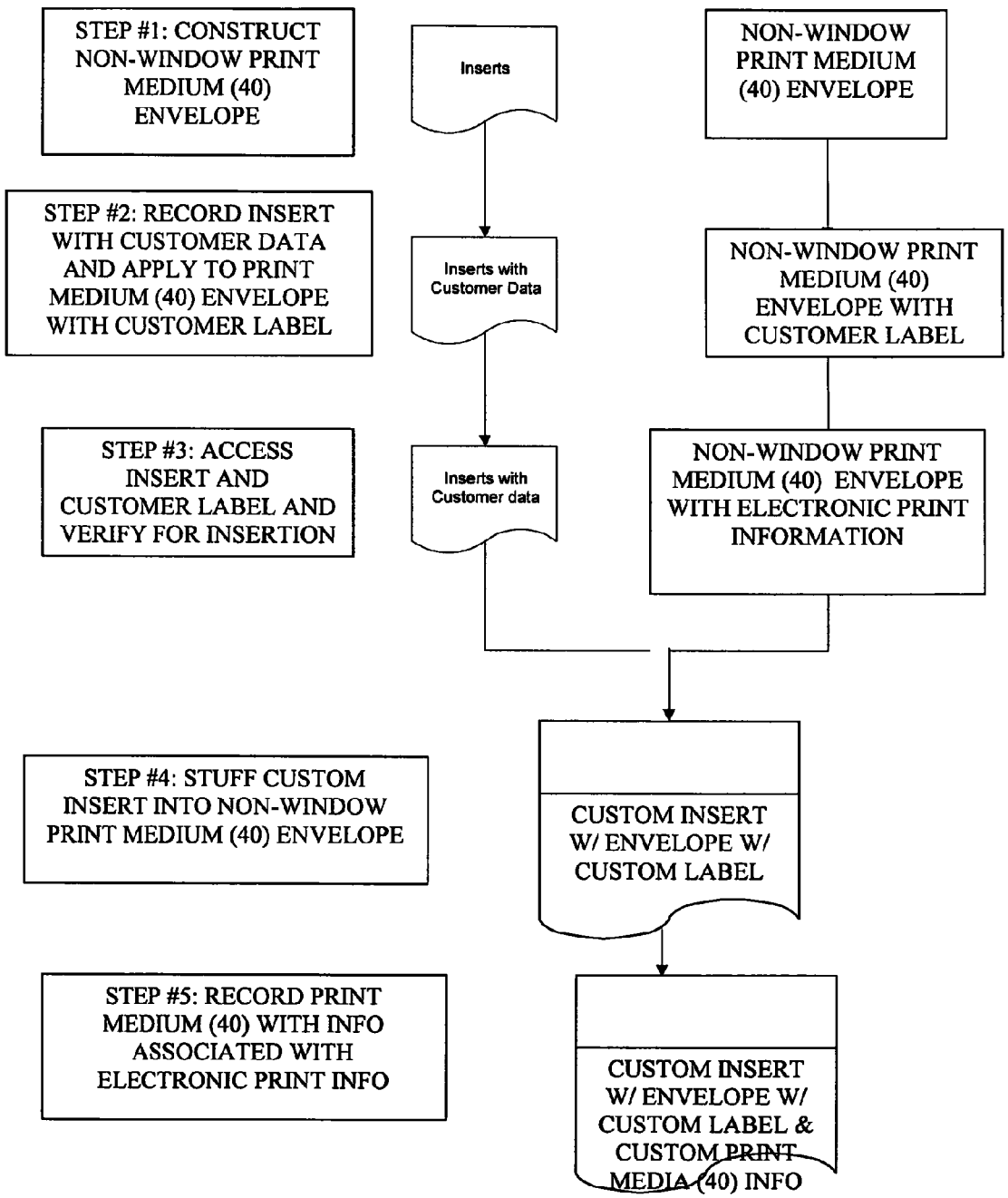
FIG. 8 is a list of the steps for manufacturing the print media of the present invention to create a non-window envelope.

Referring now primarily to FIG. 8, steps 1-5 indicate illustrative format steps that can be used to process print media 40 (FIG. 1) that is an envelope which includes the electronic recording medium as a part thereof and which is constructed without the traditional window in the envelope through which the recipient's information appears. In this case, the envelope is stuffed with the specific inserts that are to be addressed to the customer in this type of situation. As is shown, generic inserts are provided; also provided are print media envelopes that do not have the window provided therein. The insert is recorded with customer data and at the same time a label containing the customer's address and/or other information is applied to the exterior of the non-window print media envelope. Customer information that is placed on the insert and customer information that is placed on the label attached to the print media envelope are OCR scanned and verified to determine that the insert and print media envelope go together. The insert is placed into the envelope and print media reader/recorder 50 (FIG. 1) encodes the print media envelope with information specific to the customer.

Figure 9:
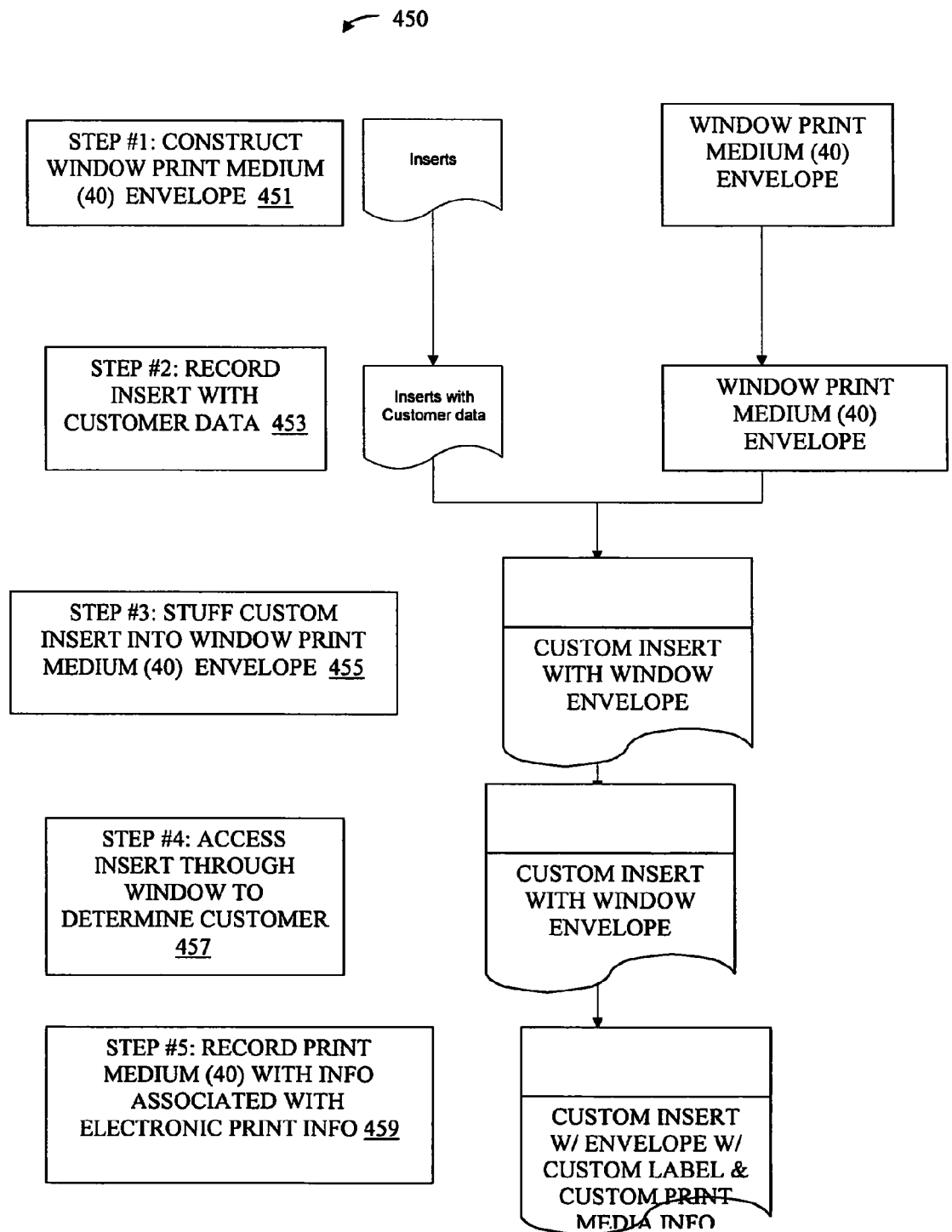
FIG. 9 is a flowchart of the steps for manufacturing the print media of the present invention to create a window envelope.

Referring now primarily to FIG. 9, steps 1-5 indicate illustrative format steps that can be used to process print media 40 (FIG. 1) that is an envelope which includes the electronic recording medium as a part thereof and which is constructed to have the traditional window in the envelope through which the recipient's information appears. Establishment 21 (FIG. 1) can provide the customized inserts along with print media 40 (FIG. 1), and the insert is then printed with the customer data thereon. The envelope with the window can receive the insert with the customer data showing through the window. Customer information can be scanned by a conventional optical character reader (OCR). Print media reader/recorder 50 (FIG. 1) can record information onto print media 40 (FIG. 1) that is specific to the particular user to whom the insert is addressed. The envelope could then be mailed to the user.

Continuing to refer to FIG. 9, method 450 can include, but is not limited to, the steps of constructing 451, by a supplier, print medium envelope that can include, but is not limited to, an electronically recordable section, and recording 453 customized transaction information on the print medium envelope insert. Method 450 can further include the steps of inserting 455 a print medium envelope insert into the print medium envelope, accessing 457 the print medium envelope insert to determine a user from the customized transaction information, and recording 459 the customized transaction information on the print medium envelope. Method 450 can optionally include the steps of mailing the print medium envelope through a physical transport, receiving the mailed print medium envelope, accessing the customized transaction information from the print medium envelope insert through a user print media reader/recorder, enabling a between the user identified by the customized transaction information and a provider identified by the customized transaction information, tracing the transaction to assess a compensation, and generating a value based on the compensation.

Figure 10A:
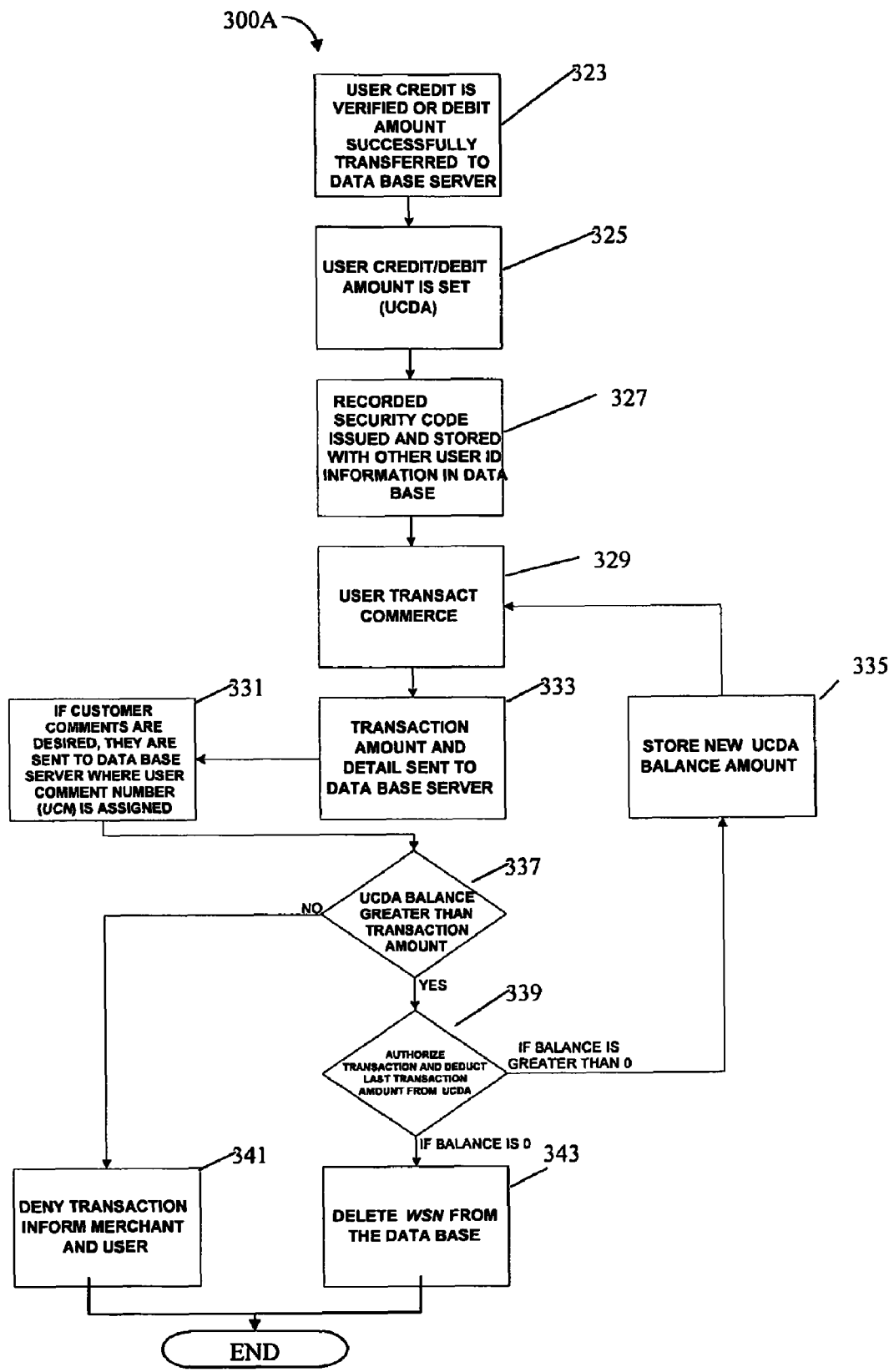
FIGS. 10A and 10B are flowcharts of the use of the print media of the present invention to conduct credit and debit transactions.

Referring now primarily to FIG. 10A, method 300A, a method for use of a generic print medium credit/debit card such as would be used at Macy's or for Verizon, in the context of the print media 40 of the present invention, can include, but is not limited to, the steps of verifying 323 that the user has credit or debit amount established and successfully transferred to the database server of the organization, and setting 325 the user's credit debit amount (UCDA). Method 300A can further include the steps of issuing 327 a recorded security code (WSN) and storing that WSN in print media database 87 (FIG. 1). Method 300A can still further include the steps of allowing 329 the user to transact e-commerce on the establishment website, and transmitting 333 the transaction cost and other details as may be required to print media database 87 (FIG. 1) after the user has selected the goods or other activity that is desired. Method 300A can include the step of requesting 331 customer comments, sending received customer comments to print media database 87 (FIG. 1), and assigning a user comment code (UCN). If, referring to method step 337, the UCDA balance is greater than the cost of the transaction that is desired, method 300A can include the steps of authorizing 339 the transaction and deducting the cost of the transaction from the UCDA. If, referring to method step 337, the UCDA balance is not greater than the cost of the transaction that is desired, method 300A can include the steps of denying 341 the transaction and informing the merchant and user that an insufficient UCDA balance exists to cover the cost of the transaction desired by the user. If the balance remaining in the UCDA is greater than zero, method 300A can include the step of storing 335 a new UCDA balance amount so that the user may continue to conduct e-commerce so long as there is a sufficient UCDA balance to permit the same. If, on the other hand, the balance is zero, method 300A can include the step of deleting 343 the WSN from print media database 87 (FIG. 1). It should be understood by those skilled in the art that the flow chart shown in FIG. 10A illustrates the steps that are taken after the user (in this case the customer who has received encoded print medium 40A) has introduced encoded print medium 40A (FIG. 1) to user print media reader/recorder 50B (FIG. 1) and connection has been made through the Internet to print media database 87 (FIG. 1) to verify the electronic print information, and connection has then been made to the establishment website, such as Macy's or Verizon.

Figure 10B:
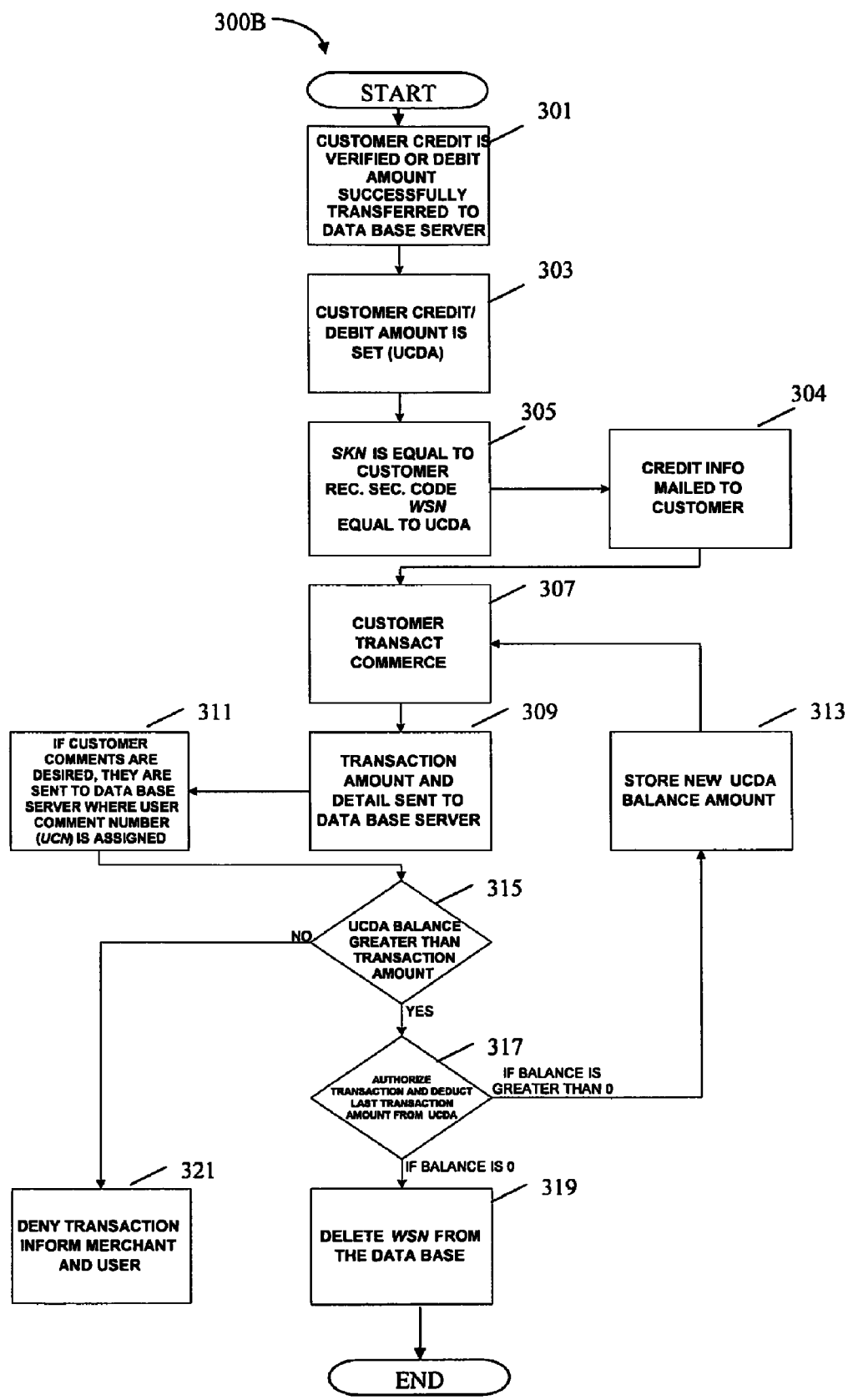

Referring now to FIG. 10B, method 300B is similar to method 300A except that after a customer credit/debit amount is set, as shown at 301, a UCDA, the WSN and the SKN all conform and method 300B informs 304 the user (customer) as to the UCDA that is available and the fact that credit is in existence for utilization by the customer to transact commerce. At this point, the customer commences a transaction of commerce and the remainder of the activity is the same at that discussed with regard to FIG. 10A. Method 300B can include, but is not limited to, the steps of verifying 301 customer credit or transferring debit amount to data base server, setting 303 customer credit/debit amount, if (decision 305) SKN is equal to customer recorded security code, and mailing 304 the credit information to the customer. Method 300B can further include the steps of transacting 307 commerce, and sending 309 the transaction amount and detail to the data base server. If customer comments are desired, method 300B can include the step of sending 311 customer comments to the data base server where a customer comment number is assigned. If (decision 315) the balance is greater than the transaction amount, method 300B can include the step of authorizing the transaction and deducting the last transaction amount. If the balance is greater than zero, method 300B can include the step of storing 313 the new balance and continuing at step 307. If (decision 315) the balance is less than or equal to the transaction amount, method 300B can include the step of denying 321 the transaction and informing the merchant and user. If (decision 317) the balance is zero, method 300B can include the step of deleting 319 the WSN from the database.

Figure 11:
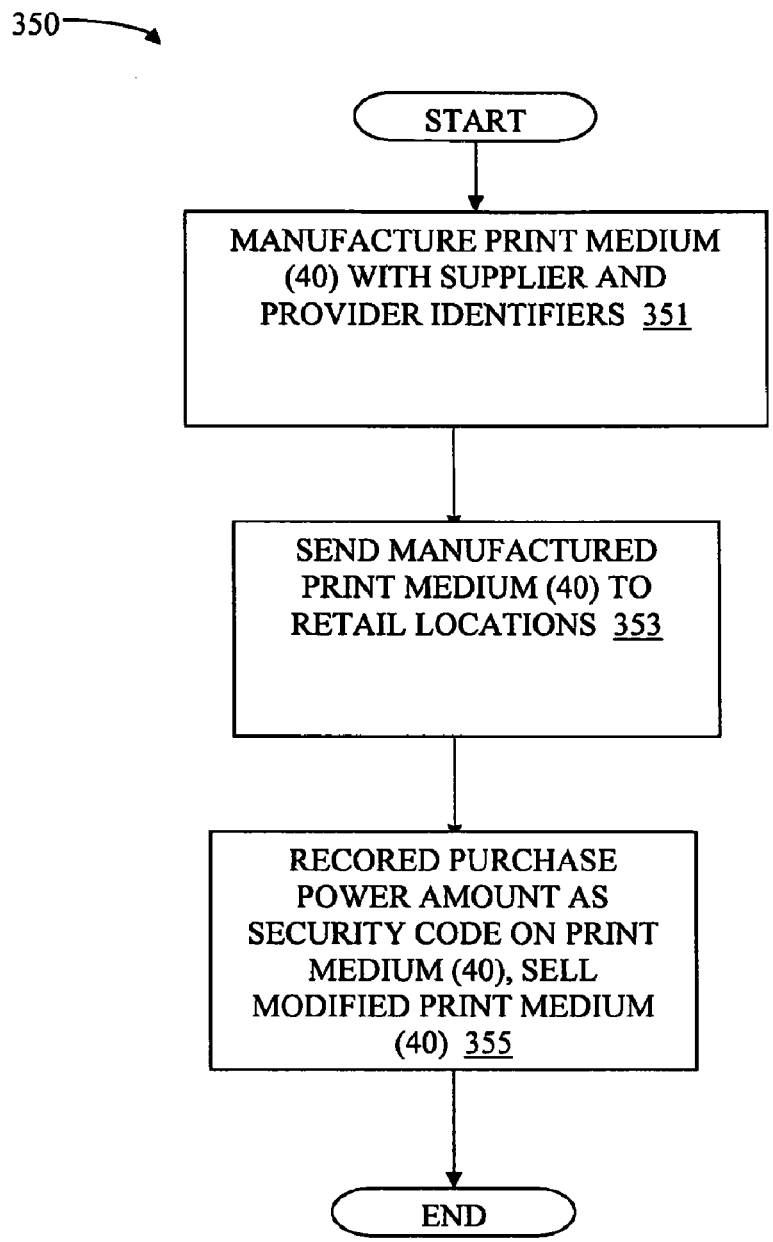
FIG. 11 is a flowchart of use of the print media of the present invention to provide gift cards.

Referring now primarily to FIG. 11, method 350, which illustrates the method of use of print media 40 (FIG. 1) as the gift card by an organization that provides products or services to the public generally, can include, but is not limited to, the steps of manufacturing 351 print medium 40 (FIG. 1) and, at the time of its manufacture, encoding provider electronic print information 13 (FIG. 4) or facilitator electronic print information 14A that identifies the particular merchant that is providing the goods or services to the customer. Method 350 can further include the steps of sending 353 print media 40 to the various retail locations that have subscribed to this service. Print media 40 (FIG. 1) that are functioning as gift cards can be segregated according to the electronic print information appearing on each one so that they can be sent to the particular retail location with which provider electronic print information 13 (FIG. 4) is associated. Method 350 can further include the step of encoding 355 the amount of the gift card print medium 40 (FIG. 1) into the electronic recording medium of print medium 40 (FIG. 1) by provider print media reader/recorder 50C (FIG. 1) after the purchase of print medium 40 (FIG. 1) from the retailer. The amount is designated as an appropriate WSN. Subsequently, the customer may present print medium 40 (FIG. 1) in the form of a gift card to a recipient who may then utilize print media 40 (FIG. 1) at establishment 21 (FIG. 1) to purchase goods or services being provided by establishment 21 (FIG. 1). Establishment 21 (FIG. 1), upon receipt of print media 40 (FIG. 1), can introduce print media 40 (FIG. 1) to provider print media reader/recorder 50C (FIG. 1) to verify its authenticity and the amount for which it may be used.

Figure 12:
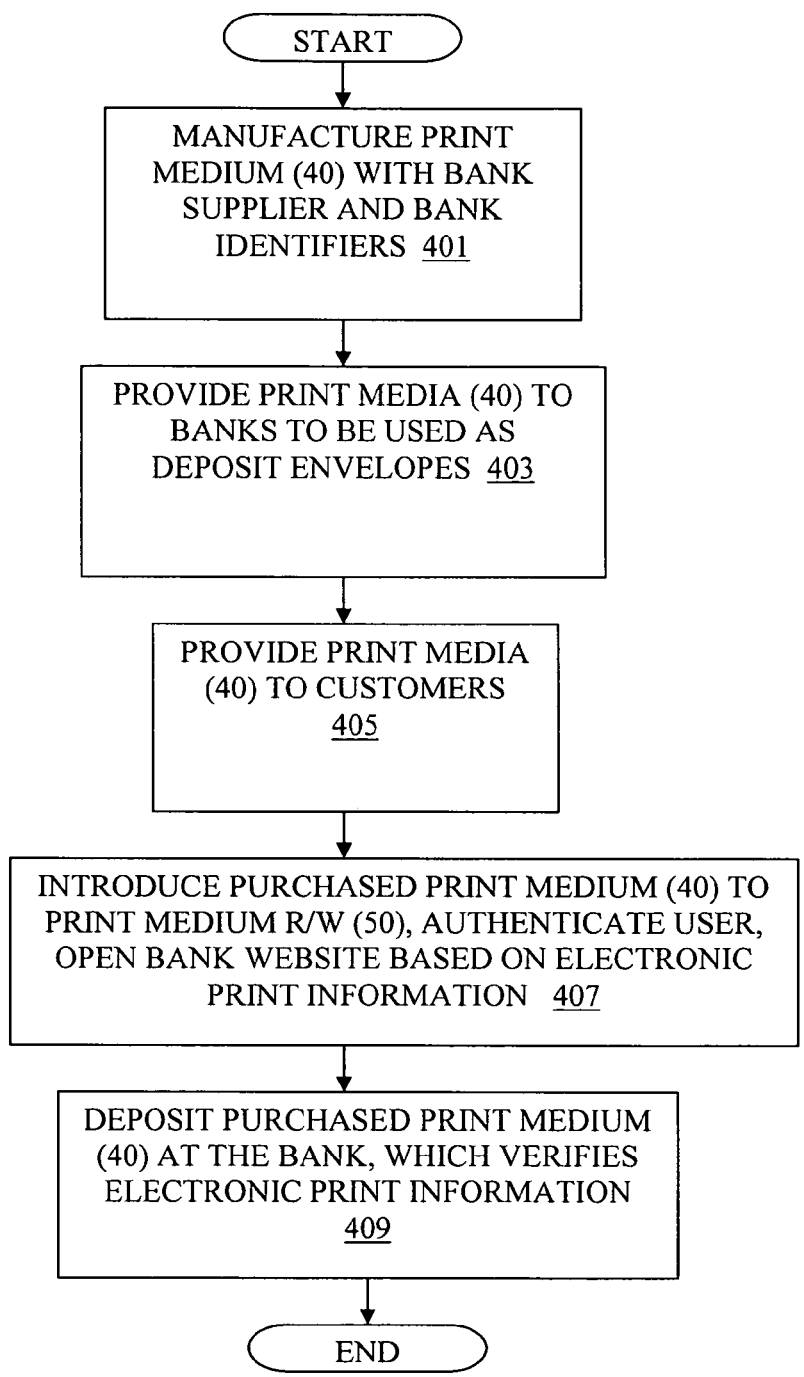
FIG. 12 is a flowchart of use of the print media of the present invention to enable banking transactions.

Referring now primarily to FIG. 12, method 400, a method by which a customer can use print media 40 (FIG. 1) for making a bank deposit, can include, but is not limited to, the steps of manufacturing 401 print media 40 (FIG. 1) having electronic print information including bank supplier and identifiers recorded in the electronic recording medium. Electronic print information could include, but is not limited to including, a unique identifier code that is associated with a particular print medium 40 (FIG. 1) and is utilized to verify that print medium 40 (FIG. 1) is authentic. Electronic print information could also include a unique identifier for the bank in a specific predefined location on print media 40 (FIG. 1). Method 400 can further include the step of shipping 403 encoded print media 40A (FIG. 1) to the associated bank, and providing 405 print media 40 (FIG. 1) to customers who desire them. In the illustrative embodiment, the bank's customer can call upon the bank to obtain print media 40 (FIG. 1) for making a deposit into the customer's bank account. Method 400 can include the steps of introducing 407 print media 40 (FIG. 1) to user print media reader/recorder 50B (FIG. 1) after user print media reader/recorder 50B (FIG. 1) is properly activated by the utilization of the proper biometric, and through interconnection with the Internet, verify electronic print information by accessing print media database 87 (FIG. 1). Method 400 can further include the step of depositing 409 print medium 40 (FIG. 1) in the bank which introduces print medium 40 (FIG. 1) to provider print media reader/recorder 50C (FIG. 1) and verifies the electronic print information from the bank's database.

Referring to FIGS. 5-12, the methods depicted in these figures can be, in whole or in part, implemented electronically. Signals representing actions taken by elements of the system can travel over electronic communications media, optionally within communications network 71 (FIG. 1). Control and data information can be electronically executed and stored on computer-readable media. The system can be implemented to execute on at least one node, and possibly across several nodes in communications network 71 (FIG. 1), where a node refers to any piece of equipment that can be electronically coupled to communications network 71 (FIG. 1), and can include, but is not limited to equipment such as a PC, a cell phone, or a PDA. Common forms of computer-readable media include, for example, a floppy disk, a flexible disk, a hard disk, magnetic tape, or any other magnetic medium, a CDROM or any other optical medium, punched cards, paper tape, or any other physical medium with patterns of holes, a RAM, a PROM, and EPROM, a FLASH-EPROM, or any other memory chip or cartridge, a carrier wave, electronic signal, computer data signal, or any other medium from which a computer can read.

Referring now primarily to FIGS. 13A-C, there are numerous applications for print media 40 (FIG. 1), a subset of which are set forth as specific types of applications and the manner in which print media 40 (FIG. 1) may be utilized in each of these applications. It should be understood by those skilled in the art that the listing of the various applications to which print media 40 (FIG. 1) may be put should not be considered limiting, but merely illustrative of the various types of applications to which the print media 40 (FIG. 1) may be put. Those skilled in the art upon consideration of the applications as listed will recognize that there are a multitude of other applications, including various types of business-to-business applications, which would be amenable to the use of print media 40 (FIG. 1). Codes in FIGS. 13A-C are defined as follows:

SKE—a unique identifier code based on each print medium 40 at the time of manufacture by the manufacturer.

SKN—a security identifier associated with all data related to print media 40 such that it may include name, address, account code, credit card code, security password, website address, telephone number, transaction code and the like, as well as any other personalized and customized targeted information.

WSN—recorded security code.

ETN—Envelope tracking code at a print media manufacturer.

UCN—User transaction, reference or comment code.

UCDA—User credit/debit amount.

In the tables in FIGS. 13A-C, designations across the top identify an organization or organization type (in many instances with specific examples being given) that would be utilizing print media 40 in its business operations. The column on the left specifies, for example, the entity that could record certain information on print media 40 (FIG. 1). For example, the SKE can normally be recorded by the print media supplier 32 (FIG. 1) or manufacturer while the SKN may be recorded by establishment 21 (FIG. 1) or print media supplier 32 (FIG. 1) or manufacturer, depending upon the particular application. It is believed that the information as provided on FIGS. 13A-C is in sufficient detail to be understood by one skilled in the art without further detailed description or discussion. It should also be recognized in FIG. 13A under "flow chart" on the left hand side that specific flow charts are identified. Those have been or will be discussed herein. No flow charts are provided with regard to the applications specified on FIGS. 13B and 13C. It is believed that through analysis of the flow charts which represent the applications as set forth on FIG. 13A, sufficient information and data are provided to enable those skilled in the art to understand the function and develop the flow charts which would be applicable for the applications set forth in FIGS. 13B and 13C. Reference should also be made to FIGS. 6 and 7 with regard to the flow charts that are associated with Direct Marketing (Macys) and Transactional Mailer (Verizon-Proxy Svcs). As indicated above, each of the additional applications as set forth in FIGS. 13B and 13C may have similar flow charts developed for them to accommodate the particular transaction desired between establishment 21 and the customer. As also indicated above, there will be a multiplicity of additional applications in which print media 40 may be used for various purposes.

Other variations of the described teachings will occur to those skilled in the art, given the benefit of the described teachings. The following claims define the scope of the invention.

What is claimed is:

1. A system that involves at least one insert containing print and electronic information which may include transaction information for enabling at least one transaction comprising:
   a print medium that is a container or bound and that permits insertion therein of said at least one insert, said print medium includes at least one electronically recordable section upon which electronic information is recorded, the electronic information containing information derived from the at least one insert:
   a print media reader/recorder capable of
   (a) accessing said electronic information from said at least one electronically recordable section; and
   (b) receiving user authentication information through user input to authenticate a user; and
   a print media monitor capable of
   (a) receiving said electronic information from said print media reader/recorder;
   (b) enabling the at least one transaction by electronically coupling the user with a provider identified by said electronic information;
   (c) tracing the at least one transaction in order to calculate and assess a compensation;
   (d) establishing a value based on said compensation; and
   (e) providing at least part of said value to at least said provider and another recipient.

2. The system of claim 1 wherein said print media reader/recorder is further capable of determining if the user is authorized to access said electronic information on said print medium.

3. The system of claim 1 wherein said print media monitor is further capable of determining if the user is authorized to access said electronic information on said print medium.

4. The system of claim 1 wherein said another recipient comprises:
   a supplier capable of supplying said print medium.

5. The system of claim 4 wherein said supplier is selected from a group consisting of a facilitator and a print media supplier.

6. The system of claim 4 wherein said supplier comprises a facilitator capable of receiving said at least part of said value and facilitating the at least one transaction.

7. The system of claim 4 wherein said supplier comprises a print media supplier capable of receiving said at least part of said value and facilitating the at least one transaction.

8. The system as in claim 1 wherein said provider is capable of supplying said print medium.

9. The system of claim 1 wherein said another recipient comprises:
   a facilitator capable of facilitating the at least one transaction.

10. The system of claim 1 wherein said provider is selected from a group consisting of a facilitator and an establishment, and is capable of facilitating the at least one transaction.

11. The system of claim 1 wherein said provider comprises a facilitator capable of receiving said at least part of said value and facilitating the at least one transaction.

12. The system of claim 1 wherein said provider comprises an establishment capable of receiving said at least part of said value and facilitating the at least one transaction.

13. The system of claim 1 wherein said at least one electronically recordable section includes print medium supplier electronic information and provider electronic information.

14. The system of claim 1 wherein said at least one electronically recordable section includes facilitator electronic information and provider electronic information.

15. The system of claim 1 wherein said at least one electronically recordable section includes print medium supplier electronic information and facilitator electronic information.

16. The system of claim 13 wherein said provider is capable of facilitating the at least one transaction, and wherein said print media reader/recorder is further capable of recording said provider electronic information about said provider and capable of recording user identifying electronic information on said at least one electronically recordable section.

17. The system of claim 13 wherein said another recipient comprises:
a print media supplier capable of facilitating the at least one transaction, and capable of receiving said at least part of said value;
wherein said print media reader/recorder is further capable of recording said print media supplier electronic information about said print media supplier and capable of recording user identifying electronic information on said at least one electronically recordable section.

18. The system of claim 14 wherein said another recipient comprises:
a facilitator capable of facilitating the at least one transaction, and capable of receiving said at least part of said value;
wherein said print media reader/recorder is further capable of recording said facilitator electronic information about said facilitator and capable of recording user identifying electronic information on said at least one electronically recordable section.

19. The system of claim 1 wherein said print media reader/recorder is further capable of reading said electronic information from said print medium and recording said electronic information onto said print medium.

20. (Currently. Amended) The system of claim 13 wherein said print media reader/recorder is further capable of receiving said print media supplier electronic information and said provider electronic information from said print medium.

21. The system of claim 14 wherein said print media reader/recorder is further capable of receiving said facilitator electronic information and said provider electronic information from said print medium.

22. The system of claim 15 wherein said print media reader/recorder is further capable of receiving said print medium supplier electronic information and said facilitator electronic information from said print medium.

23. The system of claim 13 wherein said another recipient comprises:
a print media supplier capable of facilitating the at least one transaction, and capable of receiving said at least part of said value,
wherein said print media monitor is further capable of verifying that said print medium is supplied by said print media supplier by comparing said print medium supplier electronic information with predetermined print media supplier information.

24. The system of claim 14 wherein said another recipient comprises:
a facilitator capable of facilitating the at least one transaction, and capable of receiving said at least part of said value,
wherein said print media monitor is further capable of verifying that said print medium is supplied by said facilitator by comparing said facilitator electronic information with predetermined facilitator information.

25. The system of claim 1 wherein said print media reader/recorder further comprises:
a biometric reader capable of
(a) setting user verification information;
(b) receiving said user authentication information;
(c) authenticating the user based on said user authentication information and said user verification information;
(e) providing said user verification information to said print media monitor; and
(f) providing said user authentication information to said print media monitor.

26. The system of claim 25 wherein said print media monitor comprises:
a biometric processor capable of determining user status from said user authentication information received from said biometric reader.

27. The system of claim 1 wherein said print media reader/recorder comprises:
a print media electronic data accessor capable of accessing said electronic information from said print media and providing said electronic information to said print media monitor.

28. The system of claim 1 wherein said print media reader/recorder comprises:
a card reader capable of reading and recording coded electronic information and providing said coded electronic information to said print media monitor.

29. The system of claim 1 wherein said print media reader/recorder comprises:
a card reader capable of reading and recording coded magnetic information and providing said coded magnetic information to said print media monitor.

30. The system of claim 13 wherein said print media monitor comprises:
a mapping processor capable of determining said provider identified by said provider electronic information, and enabling electronic communication between said provider and the user,
wherein said provider is capable of facilitating the at least one transaction.

31. The system of claim 14 wherein said print media monitor comprises:
a mapping processor capable of determining a facilitator identified by said facilitator electronic information, and enabling electronic communication between said facilitator and the user,
wherein said facilitator is capable of receiving said at least part of said value and facilitating the at least one transaction.

32. The system of claim 13 wherein said print media monitor comprises:
a mapping processor capable of determining an establishment identified by provider electronic information, and enabling electronic communication between said establishment and the user,
wherein said establishment is capable of receiving said at least part of said value and facilitating the at least one transaction.

33. The system of claim 13 wherein said print media monitor comprises:
a mapping processor capable of determining a print media supplier identified by said print media supplier electronic information, and enabling electronic communication between said print media supplier and the user,
wherein said print media supplier is capable of receiving said at least part of said value and facilitating the at least one transaction.

34. The system of claim 1 further comprising:
a print media reader/recorder transaction tracer capable of monitoring and recording the at least one transaction.

35. The system of claim 1 wherein said print medium comprises:
at least one envelope.

36. The system of claim 1 wherein said print medium comprises:
at least one sheet of paper.

37. The system of claim 1 wherein said print medium is selected from the group consisting of paper, cardboard, plastic, textiles, leather, rubber, glass, mirrors, stone, wood, ferrous and non-ferrous metals, natural and synthetic materials and any manufactured and converted product selected from the group consisting of cards, labels, envelopes, boxes, cartons, cans, bottles, packaging, flexible packaging, non flexible packaging, containers, and any material that can be printed and recorded upon.

38. The system of claim 1 wherein said print medium comprises:
a security code capable of being decoded by said provider.

39. The system of claim 1 wherein said print medium comprises:
a security code capable of being decoded by a supplier;
wherein said supplier is capable of supplying said print medium and capable of receiving said at least part of said value.

40. The system of claim 1 wherein said print medium comprises:
a security code capable of being decoded by a facilitator;
wherein said facilitator is capable of facilitating the at least one transaction and is capable of receiving said at least part of said value.

41. The system of claim 1 wherein said print medium comprises:
a security code capable of being decoded by a print media supplier;
wherein said print media supplier is capable of facilitating the at least one transaction and is capable of receiving said at least part of said value.

42. The system of claim 1 wherein said print medium comprises:
a security code capable of being decoded by an establishment;
wherein said establishment is capable of facilitating the at least one transaction and is capable of receiving said at least part of said value.

43. The system of claim 1 wherein said electronically recordable section comprises an electronic recording means.

44. The system of claim 1 wherein said electronic information is selected from a group consisting of print medium supplier electronic information, provider electronic information, facilitator electronic information, establishment electronic information, and user identifying electronic information.

45. The system of claim 1 wherein said print media reader/recorder is selected from a group consisting of a provider print media reader/recorder, a facilitator print media reader/recorder, an establishment print media reader/recorder, a user print media reader/recorder, and a supplier print media reader/recorder.

46. The system of claim 1 wherein said print media monitor comprises:
a biometric processor capable of providing verification of user authentication information by comparing biometric information with data stored in a print media database;
a user authenticator capable of verifying user identification electronic information;
a supplier authenticator capable of providing verification of print medium supplier electronic information or facilitator electronic information;
a security code processor capable of determining appropriate processing based on a security code read from encoded print media by said print media reader/recorder;
a print media reader/recorder transaction tracer capable of tracing activities of said print media reader/recorder and recording them in said print media database, and capable of computing and assessing said compensation on behalf of an entity selected from the group consisting of said provider, a supplier, an establishment, a facilitator, and a print media supplier; and
a mapping processor capable of mapping said electronic information to applications associated with said provider, said supplier, said establishment, said facilitator, and said print media supplier, and a user identified by said electronic information.

47. A method for establishing a compensation for enabling at least one transaction through a print medium that incorporates at least one electronically recordable section, said method comprising the steps of:
inserting at least one insert into said print medium, said print medium being a container or bound;
electronically verifying that a user is associated with a print media reader/recorder;
electronically accessing from the print medium, through a print media reader/recorder, electronic information, contained at least partially from said at least one insert containing print and electronic information which may include transaction information, recorded on the at least one electronically recordable section provided by a supplier of the print medium;
electronically accessing a provider identified in the at least one electronically recordable section;
electronically enabling the at least one transaction between the user and the provider;
electronically tracing the at least one transaction to establish the compensation for said step of enabling; and
providing a value associated with the compensation to at least the provider and another recipient.

48. The method of claim 47 further comprising the step of:
verifying that the user is associated with the print medium.

49. The method of claim 47 further comprising the step of:
establishing at least part of the value for the supplier by assessing the compensation to the user.

50. The method of claim 47 further comprising the step of:
establishing at least part of the value for the supplier by assessing the compensation to the provider.

51. The method of claim 47 further comprising the step of:
establishing at least part of the value for a facilitator by assessing the compensation to the user.

52. The method of claim 47 further comprising the step of:
establishing at least part of the value for a facilitator by assessing the compensation to the provider.

53. The method of claim 47 further comprising the step of
establishing at least part of the value for a facilitator by assessing the compensation to the supplier.

54. The method of claim 47 further comprising the step of:
establishing at least part of the value for the supplier by assessing the compensation to a facilitator.

55. The method of claim 47 further comprising the step of:
establishing at least part of the value for the supplier by assessing the compensation to an establishment.

56. The method of claim 47 further comprising the step of: establishing at least part of the value for a facilitator by assessing the compensation to an establishment.

57. The method of claim 47 further comprising the step of: providing communications between the user and the provider through an Internet connection.

58. The method of claim 47 further comprising the step of: providing communications between the user and an establishment through an Internet connection.

59. The method of claim 47 further comprising the step of: providing communications between the user and a facilitator through an Internet connection.

60. The method of claim 47 further comprising the step of: providing communications between the user and the supplier through an Internet connection.

61. The method of claim 47 further comprising the step of: providing communications between the user and the provider through a telephone.

62. The method of claim 47 further comprising the step of: providing communications between the user and an establishment through a telephone.

63. The method of claim 47 further comprising the step of: providing communications between the user and a facilitator through a telephone.

64. The method of claim 47 further comprising the step of: providing communications between the user and the supplier through a telephone.

65. The method of claim 47 further comprising the steps of:
providing printed information on the print medium; and
recording the electronic information, associated with the printed information, on the at least one electronically recordable section.

66. An automated method for generating value by enabling at least one transaction through a print medium envelope comprising a computer program on a computer readable non-transitory medium executing the steps of:
receiving, from a supplier, the print medium envelope that includes at least one electronically recordable section;
recording, by a recorder, customized transaction information on a print medium insert having print and electronic information the insert to be placed in the print medium envelope;
inserting the print medium insert into the print medium envelope;
accessing, by a reader, the print medium insert to determine a user from the customized transaction information;
recording, by the recorder, at least a portion of the customized transaction information on the print medium envelope based upon information contained in the print medium insert ;
mailing the print medium envelope through a physical transport;
receiving, by a reader, the mailed print medium envelope;
accessing, by a reader, the customized transaction information from the print medium envelope insert through a user print media reader/recorder;
enabling, by a monitor, the at least one transaction between the user identified by the customized transaction information and a provider identified by the customized transaction information;
tracing, by the monitor, the at least one transaction to assess a compensation;
generating, by the monitor, a value based on the compensation; and
providing, by the monitor, at least part of the value to at least the provider and another recipient.

67. The method of claim 66 wherein the supplier comprises a print media supplier.

68. The method of claim 66 wherein the supplier comprises a facilitator.

69. The method of claim 66 wherein the provider comprises an establishment.

70. The method of claim 66 wherein the provider comprises a facilitator.

71. The method of claim 66 further comprising the step of: personalizing and customizing the print medium envelope with a printed message and an electronic message.

72. The method of claim 66 further comprising the step of: personalizing, customizing, and targeting the print medium envelope with audio messages, and video messages, personalized discounts, and coupon offerings.

73. The method of claim 66 further comprising the step of: receiving the at least part of the value into the supplier.

74. The method of claim 66 further comprising the step of: receiving the at least part of the value into a facilitator.

75. The method of claim 66 further comprising the step of: receiving the at least part of the value into a print media supplier.

76. The method of claim 66 further comprising the step of: receiving the value into the provider.

77. The method of claim 66 further comprising the step of: receiving the at least part of the value into an establishment.

* * * * *